United States Patent
Trudeau et al.

(10) Patent No.: US 10,944,986 B2
(45) Date of Patent: Mar. 9, 2021

(54) METHODS AND SYSTEMS FOR DETERMINING MOTION VECTORS IN A MOTION ESTIMATION PROCESS OF A VIDEO ENCODER

(71) Applicant: ECOLE DE TECHNOLOGIE SUPERIEURE, Montreal (CA)

(72) Inventors: Luc Trudeau, Saint-Bruno-de-Montarville (CA); Stéphane Coulombe, Brossard (CA); Christian Desrosiers, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 727 days.

(21) Appl. No.: 15/009,938

(22) Filed: Jan. 29, 2016

(65) Prior Publication Data
US 2016/0227218 A1    Aug. 4, 2016

Related U.S. Application Data

(60) Provisional application No. 62/109,123, filed on Jan. 29, 2015.

(51) Int. Cl.
*H04N 19/52*     (2014.01)
*H04N 19/567*    (2014.01)

(52) U.S. Cl.
CPC .......... *H04N 19/567* (2014.11); *H04N 19/52* (2014.11)

(58) Field of Classification Search
CPC .............................. H04N 19/567; H04N 19/51
See application file for complete search history.

(56) References Cited

U.S. PATENT DOCUMENTS

| | | | |
|---|---|---|---|
| 5,504,530 | A | 4/1996 | Obikane |
| 5,715,016 | A | 2/1998 | Kobayashi |
| 6,983,018 | B1 | 1/2006 | Lin |
| 2003/0026335 | A1 | 2/2003 | Thyagarajan |

(Continued)

FOREIGN PATENT DOCUMENTS

CA    2885501    9/2015

OTHER PUBLICATIONS

G. J. Sullivan, J.-R. Ohm, W.-J. Han, T. Wiegand, Overview of The High Efficiency Video Coding (HEVC) Standard, IEEE Transactions on Circuits and Systems for Video Technology, Dec. 2012, pp. 1649-1668, vol. 22, No. 12, http://ieeexplore.ieee.org/xpls/abs_all.jsp?arnumber=6316136.

(Continued)

*Primary Examiner* — William C Vaughn, Jr.
*Assistant Examiner* — Jerry T Jean Baptiste
(74) *Attorney, Agent, or Firm* — IP-Mex Inc.; Victoria Donnelly

(57) ABSTRACT

Methods and systems for determining motion vectors in a motion estimation process of a video encoder are provided. Embodiments of the present invention provide a solution for the problem of unnecessary cost function evaluations, found when combining the successive elimination method with a predetermined list of candidate motion vectors search ordering. In order to solve this problem, embodiments of the present invention provide an adaptive scan ordering of block matching candidates within a search area. Advantageously, embodiments of the present invention will only evaluate necessary cost functions, without impacting rate-distortion.

20 Claims, 13 Drawing Sheets

(56) References Cited

U.S. PATENT DOCUMENTS

| | | | |
|---|---|---|---|
| 2005/0243926 A1* | 11/2005 | Hubrich | H04N 5/145 375/240.16 |
| 2006/0262848 A1 | 11/2006 | Togita | |
| 2007/0127575 A1 | 6/2007 | Ho | |
| 2007/0286286 A1* | 12/2007 | Heng | H04N 19/513 375/240.16 |
| 2009/0327611 A1 | 12/2009 | Fang | |
| 2011/0200112 A1 | 8/2011 | Won | |
| 2013/0016788 A1* | 1/2013 | Oh | H04N 19/107 375/240.16 |
| 2013/0121401 A1 | 5/2013 | Zheludkov | |

OTHER PUBLICATIONS

ISO/IEC JTC 1/SC 29/WG 11, High Efficiency Video Coding, ITU-T H.265 Recommendation, Rev. 1.0, Apr. 2011.

ITU-T SG16 Q.6 and ISO/IEC JTC 1/SC 29/WG 11, Advanced Video Coding for Generic Audiovisual Services, ITU-T H.264 Recommendation, Rev. 1.0, May 2003.

A. Tourapis, O. Au, M. Liou, Predictive Motion Vector Field Adaptive Search Technique (PMVFAST): Enhancing Block-Based Motion Estimation, SPIE Visual Communications and Image Processing, Dec. 2000, pp. 883-892, vol. 4310, http://dx.doi.org/10.1117/12.411871.

A. Tourapis, Enhanced Predictive Zonal Search for Single and Multiple Frame Motion Estimation, SPIE Visual Communications and Image Processing, Jan. 2002, pp. 1069-1079, vol. 4671, http://dx.doi.org/10.1117/12.453031.

W. Li, E. Salari, Successive Elimination Algorithm for Motion Estimation, IEEE Transactions on Image Processing, Jan. 1995, pp. 105-107, vol. 4, No. 1, http://www.ncbi.nlm.nih.gov/pubmed/18255420.

X. Gao, C. J. Duanmu, C. Zou, A Multilevel Successive Elimination Algorithm for Block Matching Motion Estimation, IEEE Transactions on Image Processing, Mar. 2000, pp. 501-504, vol. 9, No. 3, http://www.ncbi.nlm.nih.gov/pubmed/18255420.

C. Zhu, W.-S. Qi, W. Ser, Predictive Fine Granularity Successive Elimination for Fast Optimal Block-Matching Motion Estimation, IEEE Transactions on Image Processing, Feb. 2005, pp. 213-221, vol. 14, No. 2.

M. Coban, R. Mersereau, A Fast Exhaustive Search Algorithm for Rate-Constrained Motion Estimation, IEEE Transactions on Image Processing, May 1998, pp. 769-773, vol. 7, No. 5, http://www.ncbi.nlm.nih.gov/pubmed/18276290.

K. McCann, B. Bross, W. Han, I. Kim, JCTVC-O1002 High Efficiency Video Coding (HEVC) Test Model 13 (HM 13) Encoder Description, JCT-VC, Tech. Rep, Oct. 2013.

M. Yang, H. Cui, K. Tang, Efficient Tree Structured Motion Estimation Using Successive Elimination, Vision, Image and Signal Processing, IEE Proceedings, Oct. 2004, pp. 369-377, vol. 151, No. 5.

L. Trudeau, S. Coulombe, C. Desrosiers, Rate Distortion-Based Motion Estimation Search Ordering for Rate-Constrained Successive Elimination Algorithms, 2014 IEEE International Conference on Image Processing (ICIP 2014), Oct. 2014, pp. 3175-3179, Paris, France.

T. Toivonen, J. Heikkila, Fast Full Search Block Motion Estimation for H.264/AVC With Multilevel Successive Elimination Algorithm, 2004 IEEE International Conference on Image Processing (ICIP 2004), Oct. 2004, pp. 1485-1488, Singapore.

ISO/IEC JTC 1/SC 29/WG 11, High Efficiency Video Coding, ITU-T H.265 Recommendation, Rev. 1.0, Apr. 2015.

ITU-T SG16 Q.6 and ISO/IEC JTC 1/SC 29/WG 11, Advanced video coding for generic audiovisual services, ITU-T H.264 Recommendation, Rev. 1.0, Feb. 2014.

\* cited by examiner

METHODS AND SYSTEMS FOR DETERMINING MOTION VECTORS IN A MOTION ESTIMATION PROCESS OF A VIDEO ENCODER

CROSS REFERENCES TO RELATED APPLICATIONS

This application claims the benefit from the U.S. provisional application Ser. No. 62/109,123, filed on Jan. 29, 2015, the entire contents of which are incorporated herein by reference.

FIELD OF INVENTION

The present invention relates to methods and systems for the encoding of video images and, in particular, to methods and systems for determining motion vectors in a motion estimation process of a video encoder.

BACKGROUND

In the context of video compression, motion estimation algorithms improve compression by exploiting spatiotemporal predictability. Given a cost function, they select the best candidate block from a search area in one or many anchor frames to serve as a predictor for the content of the current block. This operation is often referred to as block matching.

Recent demands for beyond-HD video formats (e.g., 4K or 8K), the emergence of multi-view video content, and feature-rich video compression standards are all factors that require video encoders to consider more block sizes, more anchor frames, and use bigger search areas Sullivan, Gary J., Jens-Rainer Ohm, Woo-Jin Han, and Thomas Wiegand. 2012. "Overview of the high efficiency video coding (HEVC) standard." *IEEE Transactions on Circuits and Systems for Video Technology* 22 (12): 1649-68. Modern video encoders evaluate a much greater amount of block matching candidates than their former counterparts.

The High Efficiency Video Coding (HEVC) standard ISO/IEC JTC 1/SC 29/WG 11. 2013, *High efficiency video coding*, Recommendation ITU-T H.265, herein after ISO/IEC JTC 1/SC 29/WG 11 (2013), also known as H.265, is an example of a feature-rich video encoding standard. H.265/HEVC was designed to provide approximately 50% bit-rate savings for equivalent perceptual quality when compared to the H.264/MPEG-4 AVC standard ITU-T SG16 Q.6 and ISO/IEC JTC 1/SC 29/WG 11 2003 *Advanced video coding for generic audiovisual services*, Recommendation, ITU-T H.264. However, it also contributes to a significant increase in the computational burden related to motion estimation.

An Exhaustive Search Algorithm (ESA) performs motion estimation by evaluating the cost function for each block matching candidate inside the search area of every anchor frame. The high computational complexity incurred by evaluating the cost of all possible candidates allowed by the HEVC standard limits practical applications of the ESA in modern encoders.

Algorithms designed to reduce this computational complexity are classified according to whether or not they preserve optimality. Those that do not preserve optimality often rely on the assumption of a monotonically increasing match criterion around the location of the optimal candidate block. When this assumption does not hold, the accuracy of the motion estimation algorithm is reduced, as it will converge towards a local minimum. Modern algorithms in this class include zonal search algorithms Tourapis, A. M., O. C. Au, and M. L. Liou. 2001, "Predictive Motion Vector Field Adaptive Search Technique (PMVFAST): Enhancing Block-Based Motion Estimation." Proc. *SPIE Visual Communications and Image Processing* 4310: 883-92, doi:10.1117/12.411871 (2001); Tourapis, A. M. 2002. "Enhanced Predictive Zonal Search for Single and Multiple Frame Motion Estimation." *Proc. SPIE Visual Communications and Image Processing* 4671: 1069-79. doi:10.1117/12.453031, which first evaluate a set of predictors in order to constrain a local diamond or square search to a very narrow zone of the search area.

Optimality-preserving algorithms employ known inequalities to filter out block matching candidates. These inequalities allow to quickly determine the candidates whose cost functions cannot be smaller than that of the current best candidate. In this situation, evaluating the cost is unnecessary and only wastes computational resources. Recent algorithms in this class append more efficient filtering criteria to the successive elimination algorithm (SEA) proposed in Li, W., and E. Salari. 1995. "Successive elimination algorithm for motion estimation." IEEE Transactions on Image Processing 4 (1): 105-7. doi:10.1109/83.350809, hereinafter Li and Salari (1995). For example, Gao, X. Q., C. J. Duanmu, and C. R. Zou. 2000. "A multilevel successive elimination algorithm for block matching motion estimation." IEEE Transactions on Image Processing 9 (3): 501-4. doi:10.1109/83.826786, hereinafter Gao, Duanmu, and Zou (2000); Zhu, C., W.-S. Qi, and W. Ser. 2005. "Predictive fine granularity successive elimination for fast optimal block-matching motion estimation." IEEE Transactions on Image Processing 14 (2): 213-21, hereinafter Zhu, C., W.-S. Qi, and W. Ser. (2005). "Predictive fine granularity successive elimination for fast optimal block-matching motion estimation." *IEEE Transactions on Image Processing* 14 (2): 213-21, hereinafter Zhu, Qi, and Ser (2005) propose to partition blocks to improve filtering efficiency.

An important fact, not considered in the work of Li and Salari (1995), is that not all block matching candidates require the same amount of bits to encode their motion vector. Optimal encoding must consider not only the prediction accuracy of a candidate, but also the number of bits required to encode its vector. In encoding standard recommendations, the trade-off between prediction accuracy and motion vector cost is defined using the Lagrange multiplier (k); the Lagrange multiplier is included in the motion estimation cost function, but is not taken into consideration by the original SEA algorithm.

Coban, M. Z., and R. M. Mersereau. 1998. "A fast exhaustive search algorithm for rate-constrained motion estimation." IEEE Transactions on Image Processing 7 (5): 769-73. doi:10.1109/83.668031, hereinafter Coban and Mersereau (1998), modified the SEA filtering criterion to take into account the number of bits required to encode the motion vector of a block matching candidate. This modification is in line with the HEVC encoder-side description of the test model reference software McCann, K, B Bross, W J Han, and I K Kim. 2013. "JCTVC-O1002 High Efficiency Video Coding (HEVC) test model 13 (HM 13) encoder description." *JCT-VC, Tech. Rep*, no. November, hereinafter McCann et al. (2013), where the optimal matching candidate block is the best rate-constrained match.

The SEA filtering criterion can also be improved via the candidate search ordering used during motion estimation. Spiral search ordering outperforms raster search ordering by evaluating better block matching candidates earlier in the search process, which in turn filters out more block matching candidates. Spiral search ordering is considered state-of-the-art, and is used in many implementations of SEA-based algorithms Zhu, Qi, and Ser (2005); Coban and Mersereau (1998); Yang, M., H. Cui, and K. Tang. 2004. "Efficient Tree Structured Motion Estimation Using Successive Elimination." *Vision, Image and Signal Processing, IEE Proceedings*—151 (5): 369-77. doi:10.1049/ip-vis:20040720, hereinafter Yang, Cui, and Tang (2004). However, Luc Trudeau, Stephane Coulombe, and Christian Desrosiers, "Rate distortion-based Motion Estimation Search Ordering for rate-constrained Successive Elimination Algorithms" in 2014 *IEEE International Conference on Image Processing* (ICIP 2014), 3175-79, Paris, France, hereinafter Trudeau, Coulombe, and Desrosiers (2014), showed that a spiral search ordering, in a rate-constrained context, will perform unnecessary cost function evaluations.

Therefore, it would be beneficial to provide a method and system for encoding video images that would avoid performing unnecessary cost function evaluations.

SUMMARY

Embodiments of the present invention extend the work of Li and Salari (1995), Coban and Mersereau (1998) to support the H.265/HEVC standard and implement it in the HEVC reference software. However, as described in Trudeau, Coulombe, and Desrosiers (2014), the work of Li and Salari (1995), Coban and Mersereau (1998) leads to unnecessary cost function evaluations. To resolve this problem, the present invention provides methods and systems to adapt the search ordering of block matching candidates. The present invention further provides motion estimation methods and systems that can adapt the search ordering, and when combined with an early termination threshold, will only perform necessary cost function evaluations. Embodiments of the present invention provide motion estimation methods and systems capable of only performing necessary cost function evaluations. A result of motion estimation methods and systems in accordance with the present invention is essentially the same as with the ESA. If there exist several motion vectors having a same optimal result (cost value), then the choice of the optimal MV is not unique and the video performances, depending on the final choice, are slightly different, but the differences are marginal.

The present invention is directed, generally speaking, to adaptive search ordering for rate-constrained successive elimination methods and systems for encoding video images.

According to an aspect of the present invention there is provided a method for determining a best motion vector in a motion estimation process of a video encoder, the method including:

using a hardware processor for:

determining a sorted list of candidate motion vectors having an order determined by a respective approximate block similarity metric value of each of the candidate motion vectors in the list of candidate motion vectors; and determining the best motion vector by:

sequentially determining respective block similarity metric values of the candidate motion vectors in the sorted list of candidate motion vectors until the respective approximate block similarity metric value is greater than or equal to an early termination threshold corresponding to the smallest block similarity metric value among the determined respective block similarity metric values; and selecting a motion vector from the list of sorted candidate motion vectors having a smallest block similarity metric value of the determined respective block similarity metric values.

In some embodiments the method includes determining the respective approximate block similarity metric values of each of the candidate motion vectors in the list of candidate motion vectors as respective Rate Constrained Absolute Difference of Sums (RCADS) values of the candidate motion vectors in the list of candidate motion vectors.

In some embodiments the method includes determining the respective block similarity metric values of the candidate motion vectors in the sorted list of candidate motion vectors includes determining the respective block similarity metric values as Rate Constrained Sum of Absolute Differences (RCSAD) values of the candidate motion vectors in the sorted list of candidate motion vectors.

In some embodiments the method includes determining the respective approximate block similarity metric values of each of the candidate motion vectors in the list of candidate motion vectors as respective Absolute Difference of Sums (ADS) values of the candidate motion vectors in the list of candidate motion vectors.

In some embodiments the method includes determining the respective block similarity metric values of the candidate motion vectors in the sorted list of candidate motion vectors comprises determining the respective block similarity metric values as Sum of Absolute Differences (SAD) values of the candidate motion vectors in the sorted list of candidate motion vectors.

In some embodiments of the method the respective approximate block similarity metric and the respective block similarity metric are any metrics for which the former is always smaller or equal to the later.

In some embodiments the method includes the determining the sorted list of candidate motion vectors includes: determining respective approximate block similarity metric values for each candidate motion vector in a predetermined list of candidate motion vectors; and determining a sorted list of candidate motion vectors by sorting the predetermined list of candidate motion vectors according to the respective approximate block similarity metric values for each candidate motion vector.

In some embodiments the method includes the determining the list of candidate motion vectors includes: determining respective approximate block similarity metric values for each candidate motion vector in a predetermined list of candidate motion vectors; determining a subset of the predetermined list of candidate motion vectors wherein the respective approximate block similarity metric values for each candidate motion vector in the subset of the predetermined list of candidate motion vectors is less than or equal to a block similarity metric value of a predicted motion vector; and determining a sorted list of candidate motion vectors by sorting the predetermined list of candidate motion vectors according to the respective approximate block similarity metric values for each candidate motion vector.

In some embodiments the method includes determining the subset of the predetermined list of candidate motion vectors including: determining the predicted motion vector by selecting, from the predetermined list of candidate motion vectors, a motion vector having a shortest motion vector bit length of the candidate motion vectors in the predetermined list of candidate motion vectors.

In some embodiments the method includes determining the best motion vector from the list of candidate motion vectors including: sequentially determining, from the sorted list of candidate motion vectors, respective block similarity metric values of the candidate motion vectors in the sorted list of candidate motion vectors; and comparing the respective approximate block similarity metric values of the candidate motion vectors in the sorted list of candidate motion vectors with the respective block similarity metric values of the candidate motion vectors in the sorted list of candidate motion vectors.

According to another aspect of the invention there is provided a system for determining a best motion vector in a motion estimation process of a video encoder, the system including: a computer-readable storage medium having instructions stored thereon that, when executed, cause a processor to: determine a sorted list of candidate motion vectors having an order determined by a respective approximate block similarity metric value of each of the candidate motion vectors in the list of candidate motion vectors; sequentially determine respective block similarity metric values of the candidate motion vectors in the sorted list of candidate motion vectors until the respective approximate block similarity metric value is greater than or equal to an early termination threshold corresponding to the smallest block similarity metric value among the determined respective block similarity metric values; and select a motion vector as the best motion vector from the list of sorted candidate motion vectors having a smallest block similarity metric value of the determined respective block similarity metric values.

In some embodiments of the system the instructions cause the processor to determine the respective approximate block similarity metric values of each of the candidate motion vectors in the list of candidate motion vectors as respective Rate Constrained Absolute Difference of Sums (RCADS) values of the candidate motion vectors in the list of candidate motion vectors.

In some embodiments of the system the instructions that cause the processor to determine the respective block similarity metric values of the candidate motion vectors in the sorted list of candidate motion vectors cause the processor to determine the respective block similarity metric values as Rate Constrained Sum of Absolute Differences (RCSAD) values of the candidate motion vectors in the sorted list of candidate motion vectors.

In some embodiments of the system the instructions cause the processor to determine the respective approximate block similarity metric values of each of the candidate motion vectors in the list of candidate motion vectors as respective Absolute Difference of Sums (ADS) values of the candidate motion vectors in the list of candidate motion vectors.

In some embodiments of the system the instructions that cause the processor to determine the respective block similarity metric values of the candidate motion vectors in the sorted list of candidate motion vectors cause the processor to determine the respective block similarity metric values as Sum of Absolute Differences (SAD) values of the candidate motion vectors in the sorted list of candidate motion vectors.

In some embodiments of the system the respective approximate block similarity metric and the respective block similarity metric are any metrics for which the former is always smaller or equal to the later.

In some embodiments of the system the instructions that cause the processor to determine the sorted list of candidate motion vectors cause the processor to: determine respective approximate block similarity metric values for each candidate motion vector in a predetermined list of candidate motion vectors; and determine a sorted list of candidate motion vectors by sorting the predetermined list of candidate motion vectors according to the respective approximate block similarity metric values for each candidate motion vector.

In some embodiments of the system the instructions that cause the processor to determine the list of candidate motion vectors cause the processor to: determine respective approximate block similarity metric values for each candidate motion vector in a predetermined list of candidate motion vectors; determine a subset of the predetermined list of candidate motion vectors wherein the respective approximate block similarity metric values for each candidate motion vector in the subset of the predetermined list of candidate motion vectors is less than or equal to a block similarity metric value of a predicted motion vector; and determine a sorted list of candidate motion vectors by sorting the predetermined list of candidate motion vectors according to the respective approximate block similarity metric values for each candidate motion vector.

In some embodiments of the system the instructions that cause the processor to determine the subset of the predetermined list of candidate motion vectors cause the processor to: determine the predicted motion vector by selecting, from the predetermined list of candidate motion vectors, a motion vector having a shortest motion vector bit length of the candidate motion vectors in the predetermined list of candidate motion vectors.

In some embodiments of the system the instructions that cause the processor to determine the best motion vector from the list of candidate motion vectors cause the processor to: sequentially determine, from the sorted list of candidate motion vectors, respective block similarity metric values of the candidate motion vectors in the sorted list of candidate motion vectors; and compare the respective approximate block similarity metric values of the candidate motion vectors in the sorted list of candidate motion vectors with the respective block similarity metric values of the candidate motion vectors in the sorted list of candidate motion vectors.

BRIEF DESCRIPTION OF THE DRAWINGS

Further features and advantages of the invention will be apparent from the following description of the embodiment, which is described by way of example only and with reference to the accompanying drawings, in which.

Figure 1:
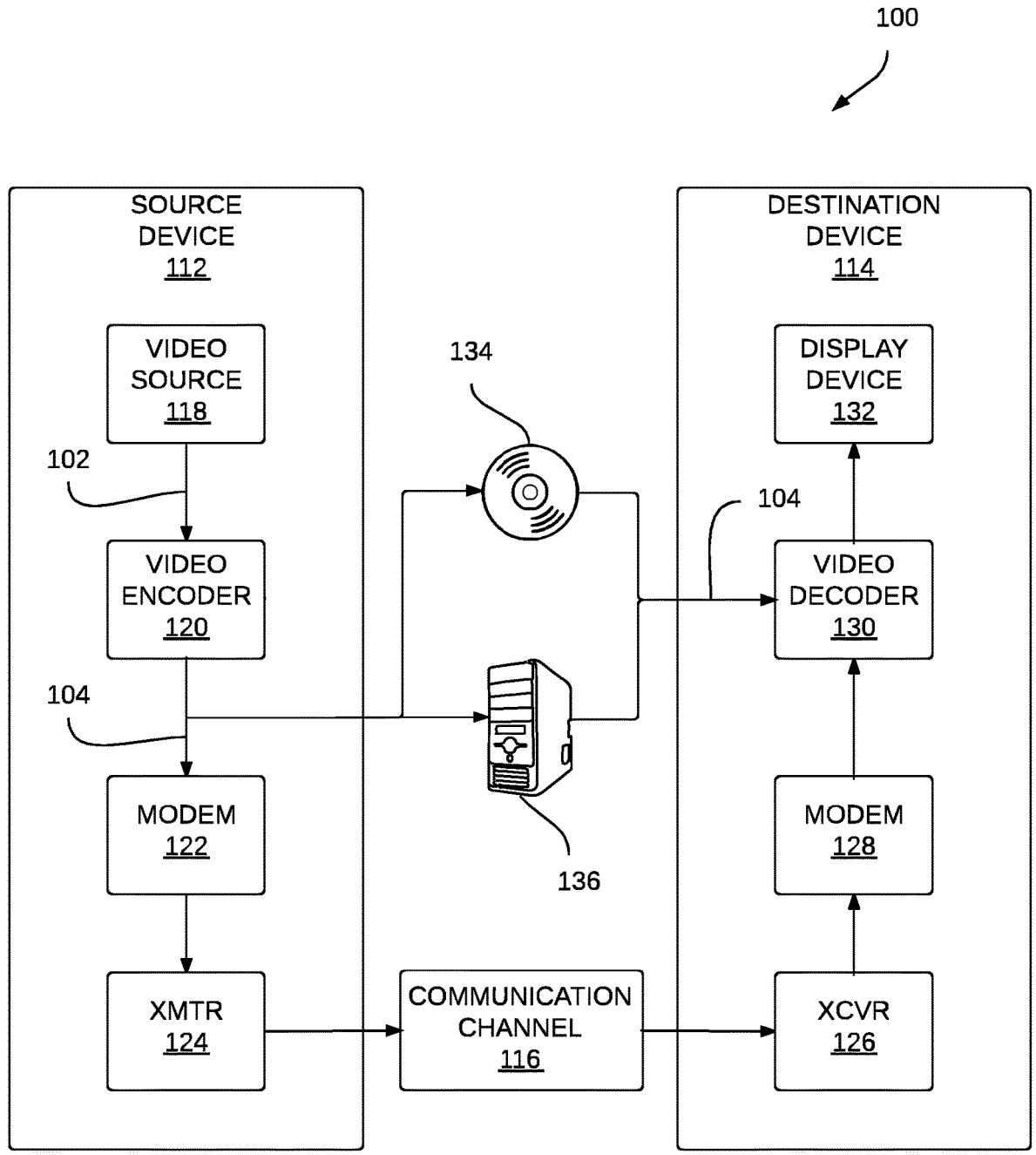
FIG. 1 is a block diagram illustrating a non-limiting example of video encoding and decoding system in accordance with embodiments of the present invention.

The accompanying drawings are included to provide a further understanding of the present invention and are incorporated in and constitute a part of this specification. The drawings illustrate some embodiments of the invention and together with the description serve to explain the principles of the invention. Other embodiments of the invention and many of the intended advantages of embodiments of the invention will be readily appreciated, as they become better understood by reference to the following detailed description. The elements of the drawings are not necessarily to scale relative to each other. Like reference numerals designate corresponding similar parts.

DETAILED DESCRIPTION OF PREFERRED EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

It should be noted at the onset that streams of video data and data output from the systems and methods for encoding the streams of video data described herein below are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

This detailed description is organized as follows. Section 1 is an overview of a system for encoding and decoding video. Section 2 describes the rate-constrained successive elimination and motivation for rate-constrained search orderings. In section 3, embodiments for generating an adaptive search ordering are presented. In section 4, the experimental procedure and results are discussed. Finally, section 5 concludes the detailed description.

1. OVERVIEW

FIG. 1 is a block diagram illustrating an example video encoding and decoding system 100 that may be configured to utilize the techniques described in this disclosure to reduce the complexity of mode selection when selecting from multiple, different prediction modes. As shown in the example of FIG. 1, system 100 includes a source device 112 that generates encoded video for decoding by destination device 114. The source device 112 may transmit the encoded video to a destination device 114 via a communication channel 116 or may store the encoded video on a storage medium 134 or a file server 136, such that the encoded video may be accessed by the destination device 114 as desired. The source device 112 and the destination device 114 may comprise any of a wide variety of devices, including desktop computers, notebook (i.e., laptop) computers, tablet computers, set-top boxes, telephone handsets (including cellular telephones or handsets and so-called smart phones), televisions, cameras, display devices, digital media players, video gaming consoles, or the like.

In many cases, such devices may be equipped for wireless communication. Hence, the communication channel 116 may comprise a wireless channel. Alternatively, the communication channel 116 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 116 may form part of a packet-based network, such as a local area network (LAN), a wide-area network (WAN), or a global network such as the Internet. The communication channel 116, therefore, generally represents any suitable communication medium, or collection of different communication media, for transmitting video data from the source device 112 to the destination device 114, including any suitable combination of wired or wireless media. The communication channel 116 may include routers, switches, base stations, or any other equipment that may be useful to facilitate communication from the source device 112 to the destination device 114.

As further shown in the example of FIG. 1, source device 112 includes a video source 118, a video encoder 120, a modulator/demodulator 122 ("modem 122") and a transmitter 124. In source device 112, a video source 118 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if the video source 118 is a video camera, the source device 112 and the destination device 114 may form so-called camera phones or video phones. The techniques described in this disclosure, however, are not limited to wireless applications or settings, and may be applied to non-wireless devices including video encoding and/or decoding capabilities. The source device 112 and the destination device 114 are, therefore, merely examples of coding devices that can support the techniques described herein.

The video encoder 120 may encode the captured, pre-captured, or computer-generated video 102. Once encoded, the video encoder 120 may output this encoded video 104 to the modem 122. The modem 122 may then modulate the encoded video 104 according to a communication standard, such as a wireless communication protocol, whereupon a transmitter 124 may transmit the modulated encoded video data to destination device 114. The modem 122 may include various mixers, filters, amplifiers or other components designed for signal modulation. The transmitter 124 may include circuits designed for transmitting data, including amplifiers, filters, and one or more antennas.

The captured, pre-captured, or computer-generated video 102 that is encoded by the video encoder 120 may also be stored onto a storage medium 134 or a file server 136 for later retrieval, decoding and consumption. The storage medium 134 may include Blu-ray discs, DVDs, CD-ROMs, flash memory, or any other suitable digital storage media for storing encoded video 104. The destination device 114 may access the encoded video 104 stored on the storage medium 134 or the file server 136, decode this encoded video 104 to generate decoded video and playback this decoded video.

The file server 136 may be any type of server capable of storing encoded video and transmitting that encoded video 104 to the destination device 114. Example file servers include a web server (e.g., for a website), an FTP server, network attached storage (NAS) devices, a local disk drive, or any other type of device capable of storing encoded video 104 and transmitting it to a destination device. The transmission of encoded video 104 from file server 136 may be a streaming transmission, a download transmission, or a combination of both. The destination device 114 may access the file server 136 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video 104 stored on a file server.

The destination device 114, in the example of FIG. 1, includes a receiver 126, a modem 128, a video decoder 130, and a display device 132. The receiver 126 of the destination device 114 receives information over the channel 116, and the modem 128 demodulates the information to produce a demodulated bitstream for the video decoder 130. The information communicated over the channel 116 may include a variety of syntax information generated by the video encoder 120 for use by the video decoder 130 in decoding the associated encoded video 104. Such syntax may also be included with the encoded video 104 stored on the storage medium 134 or the file server 136. Each of the video encoder 120 and the video decoder 130 may form part of a respective encoder-decoder (CODEC) that is capable of encoding or decoding video data.

The display device 132 of the destination device 114 represents any type of display capable of presenting video data for consumption by a viewer. Although shown as integrated with the destination device 114, the display device 132 may be integrated with, or external to, the destination device 114. In some examples, the destination device 114 may include an integrated display device and also be configured to interface with an external display device. In other examples, the destination device 114 may be a display device. In general, the display device 132 displays the decoded video data to a user, and may comprise any of a variety of display devices such as a liquid crystal display (LCD), a plasma display, an organic light emitting diode (OLED) display, or another type of display device.

The video encoder 120 and the video decoder 130 preferably operate according to a video compression standard, such as the High Efficiency Video Coding (HEVC) standard. The techniques of this disclosure, however, are not limited to any particular coding standard.

Although not shown in FIG. 1, in some aspects, the video encoder 120 and the video decoder 130 may each be integrated with an audio encoder and decoder, and may include appropriate MUX-DEMUX units, or other hardware and software, to handle encoding of both audio and video in a common data stream or separate data streams.

The video encoder 120 and the video decoder 130 each may be implemented as any of a variety of suitable encoder circuitry, such as one or more microprocessors, digital signal processors (DSPs), application-specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 120 and the video decoder 130 may be included in one or more encoders or decoders, either of which may be integrated as part of a combined encoder/decoder (CODEC) in a respective device.

Figure 2:
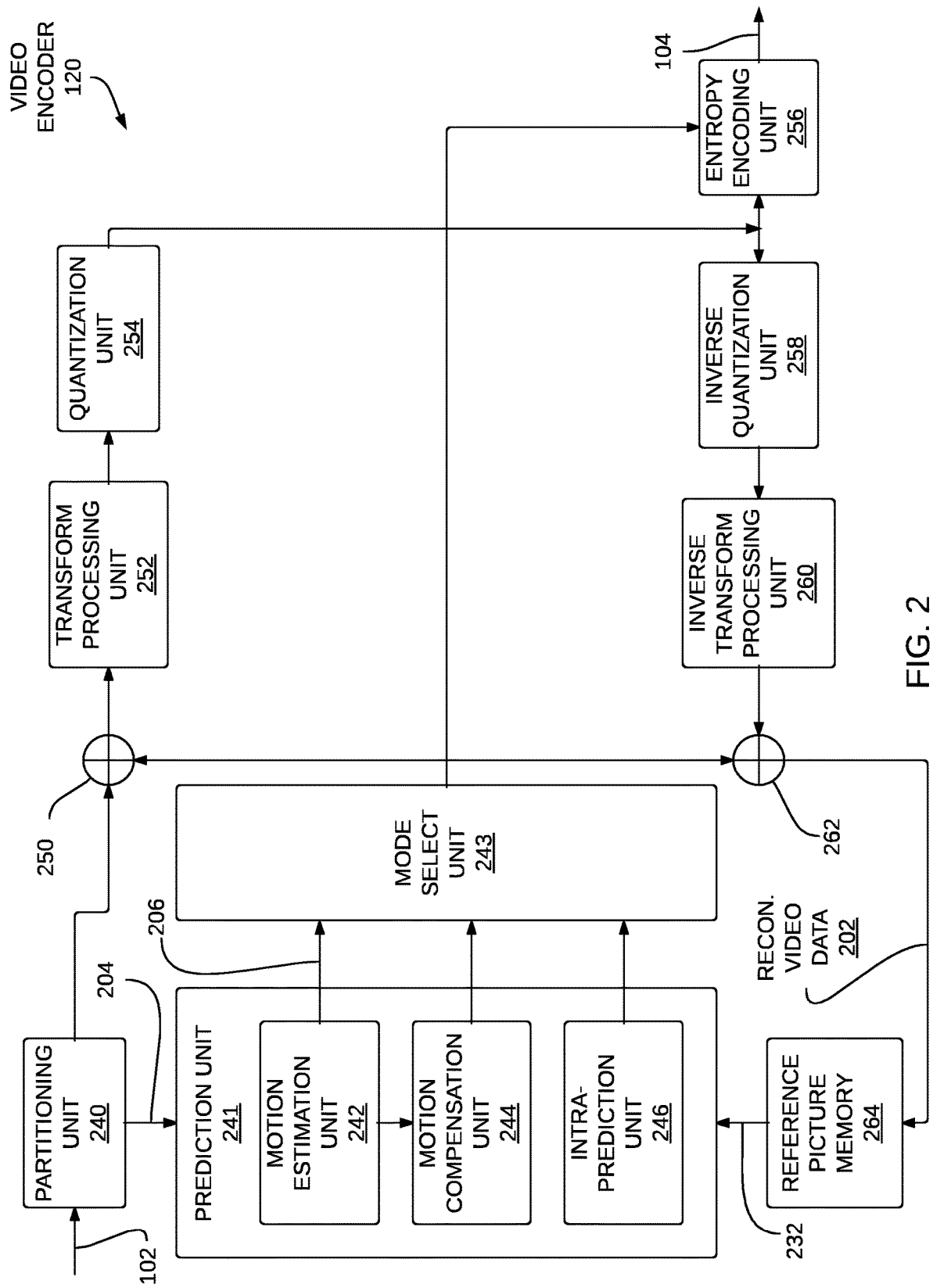
FIG. 2 is a block diagram illustrating a non-limiting example of a video encoder shown in FIG. 1.

FIG. 2 is a block diagram illustrating an example of the video encoder 120 that may implement techniques to reduce the complexity of mode selection when selecting from multiple, different prediction modes. The video encoder 120 may perform intra and inter coding of video blocks within video frames or slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, the video encoder 120 includes a memory device comprising computer readable instructions for execution by a processor, forming a partitioning unit 240, a prediction unit 241, a reference picture memory 264, a summer 250, a transform processing unit 252, a quantization unit 254, and an entropy encoding unit 256. The prediction unit 241 includes a motion estimation unit 242, a motion compensation unit 244, and an intra prediction unit 246. For video block reconstruction, the video encoder 120 also includes an inverse quantization unit 258, an inverse transform processing unit 260, and a summer 262. A deblocking filter (not shown in FIG. 2) may also be included to filter block boundaries to remove blockiness artifacts from reconstructed video 202. If desired, the deblocking filter would typically filter the output of summer 262. Additional loop filters (in loop or post loop) may also be used in addition to the deblocking filter. The video encoder 120 also includes a mode select unit 243. The mode select unit 243 may select one of the coding modes, intra or inter and video block partitioning for prediction units, e.g., based on error results.

As shown in FIG. 2, video encoder 120 receives encoded video 102, and partitioning unit 240 partitions the encoded video 102 into video blocks 204. This partitioning may also include partitioning into slices, tiles, or other larger units, as wells as video block partitioning, e.g., according to a quadtree structure of LCUs and CUs. The video encoder 120 generally illustrates the components that encode video blocks within a video slice to be encoded. In general, a slice may be divided into multiple video blocks (and possibly into sets of video blocks referred to as tiles).

A mode select unit 243 may select one of a plurality of possible coding modes, such as one of a plurality of intra coding modes or one of a plurality of inter coding modes, for the current video block based on error results (e.g., coding rate and the level of distortion). A prediction unit 241 may provide the resulting intra- or inter-coded block to summer 250 to generate residual block data and to the summer 262 to reconstruct the encoded block for use as a reference picture. In some examples, the mode select unit 243 may analyze each of the reconstructed video blocks to select a best rate-to-distortion ratio through a process commonly referred to as rate-distortion optimization (RDO). Further details of FIG. 2 described below illustrate mode selection techniques in accordance with one or more embodiments of the invention.

A motion estimation unit 242 and a motion compensation unit 244 within prediction unit 241 perform inter-predictive coding of the current video block relative to one or more predictive blocks in one or more reference pictures to provide temporal prediction. The motion estimation unit 242 may be configured to determine the inter-prediction mode for a video slice according to a predetermined pattern for a video sequence. The predetermined pattern may designate video slices in the sequence as P slices, B slices or generalized P and B (GPB) slices. The motion estimation unit 242 and the motion compensation unit 244 may be highly integrated, but are illustrated separately for conceptual purposes. Motion estimation, performed by the motion estimation unit 242, is the process of generating motion vectors 206, which estimate motion for video blocks. A motion vector 206, for example, may indicate the displacement of a video block within a current prediction unit (PU) in a video frame or picture relative to a predictive block within a reference picture.

A predictive block is a block that is found to closely match the video block of the PU to be coded in terms of pixel difference, which may be determined by sum of absolute differences (SAD), sum of square differences (SSD), or other difference metrics. In some examples, the video encoder 120 may calculate values for sub-integer pixel positions of reference pictures stored in reference picture memory 264. For example, video encoder 120 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

The motion estimation unit 242 calculates a motion vector for a video block of a PU in an inter-coded slice by comparing the position of the PU to the position of a predictive block of a reference picture 232. The reference picture 232 may be selected from a first reference picture list (List 0) or a second reference picture list (List 1), each of which identify one or more reference pictures stored in the reference picture memory 264. The motion estimation unit 242 sends the calculated motion vector to entropy encoding unit 256 via the mode select unit 243, to mode select unit 24, and motion compensation unit 244.

Motion compensation, performed by the motion compensation unit 244, may involve fetching or generating the predictive block based on the motion vector determined by motion estimation, possibly performing interpolations to sub-pixel precision. Upon receiving the motion vector for the PU of the current video block, the motion compensation unit 244 may locate the predictive block to which the motion vector points in one of the reference picture lists. When the motion vector position in integer, no interpolation of the predictive block is required; it is only fetched. When the motion vector position in fractional, interpolation is required to obtain the predictive block with sub-pixel precision. Typically, motion estimation is performed first using integer pel precision. The best integer pel motion vector is first found in a large search area and then the best fractional motion vector is found in a close neighborhood of that best integer pel motion vector. The fast method proposed here is applied to the integer pel phase since it includes significantly more motion vector candidates. The video encoder 120 forms a residual video block by subtracting pixel values of the predictive block from the pixel values of the current video block being coded, forming pixel difference values. The pixel difference values form residual data for the block, and may include both luma and chroma difference components. The summer 250 represents the component or components that perform this subtraction operation. The motion compensation unit 244 may also generate syntax elements associated with the video blocks and the video slice for use by video decoder 130 in decoding the video blocks of the video slice.

The intra prediction unit 246 within the prediction unit 241 may perform intra-predictive coding of the current video block relative to one or more neighboring blocks in the same picture or slice as the current block to be coded to provide spatial compression. Accordingly, intra prediction unit 246 may intra-predict a current block, as an alternative to the inter-prediction performed by motion estimation unit 242 and motion compensation unit 244, as described above.

In particular, the mode select unit 243 may determine an intra prediction mode to use to encode a current block based on amounts of rate distortion corresponding to a given mode and block. In some examples, the intra prediction unit 246 may encode a current block using various intra prediction modes received from the mode select unit 243, e.g., during separate encoding passes.

The mode select unit 243 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The select unit 243 may calculate ratios from the distortions and rates for the various encoded blocks to determine which intra prediction mode exhibits the best rate-distortion value for the block. According to the HEVC standard, there may be up to 35 intra prediction modes, and each intra prediction mode may be associated with an index.

When performing intra prediction, the mode select unit 243 may analyze an approximate cost associated with each possible intra prediction modes rather than performing full rate distortion analysis. This approximate cost may approximate a rate-distortion cost. Computing a full rate-distortion cost typically requires that the video encoder computes a predicted block using each of the intra prediction modes, determine a difference between each of the predicted blocks and the current block (which is commonly referred to as a "residual block" that specifies the residual pixel values referenced above), transform each of the residual blocks from the spatial domain to the frequency domain, quantize the coefficient values in each of the transformed residual blocks to generate a corresponding encoded video block of coefficients, and then decode the encoded video block, comparing each of the decoded reconstructed video blocks to the current block to determine a distortion metric to finally select the one with the lowest distortion value.

Figure 3:
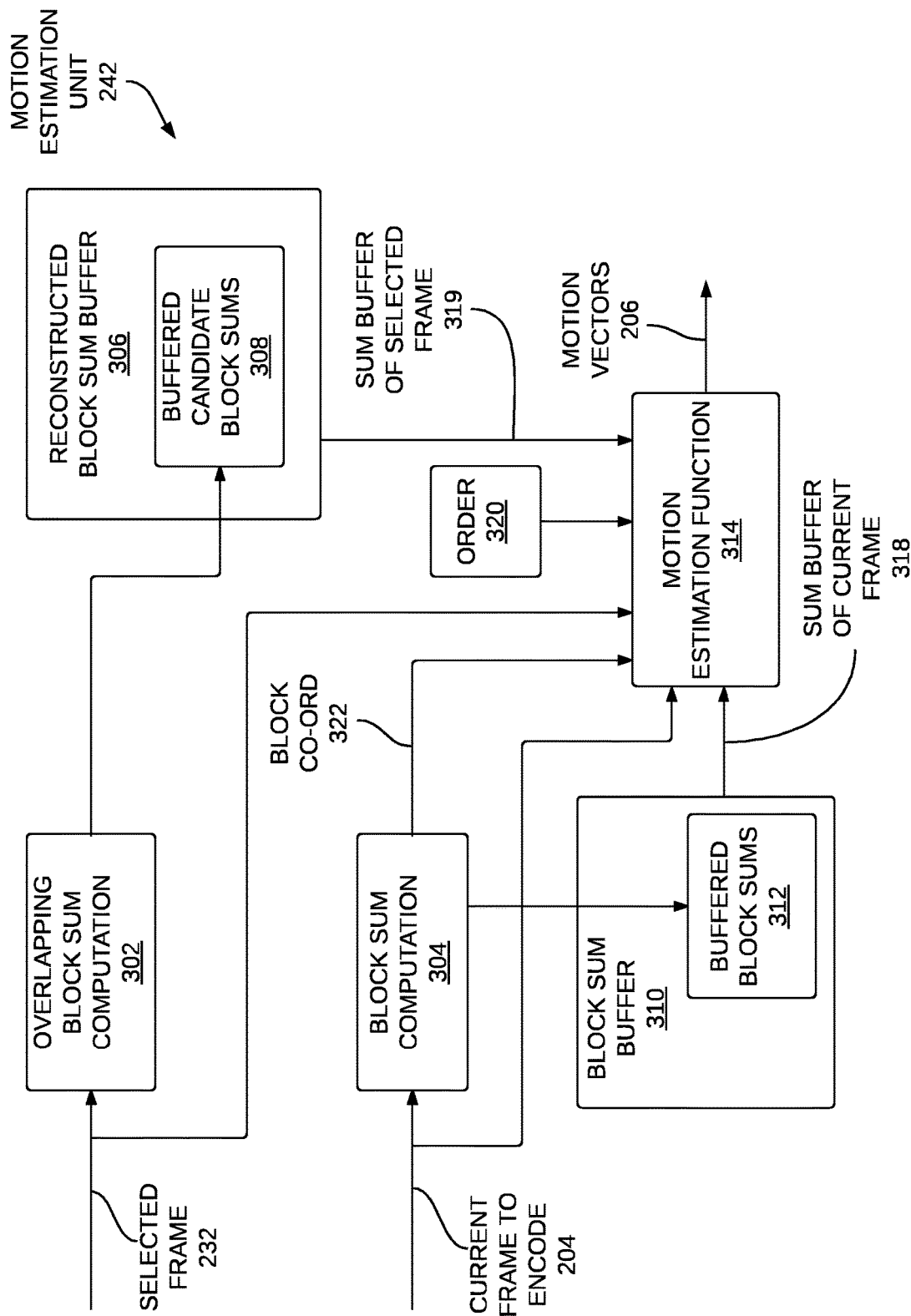
FIG. 3 is a block diagram illustrating a non-limiting example of a motion estimation unit shown in FIG. 2.

FIG. 3 shows a block diagram of the motion estimation unit 242 shown in FIG. 2. The motion estimation unit 242 includes a selected frame overlapping block sum computation unit 302 for computing a sum of pixel values for each block in the selected frame 232.

The motion estimation unit 242 further includes a current frame block sum computation unit 304 for computing a sum of pixel values for each block in the current frame 204. The current frame block sum computation unit 304 further provides co-ordinates 322 of a current frame block.

The motion estimation unit 242 still further includes a reconstructed block sum buffer 306 for holding the block sums of reconstructed frames. The reconstructed block sum buffer 306 includes a plurality of buffered candidate block sums 308 corresponding to one block sum for each possible candidate block.

The motion estimation unit 242 further includes a block sum buffer 310. The block sum buffer 310 holds the block sums 312 of frames to encode corresponding to one block sum for each non overlapping block in the current frame to encode 204. Note that block sum buffers 310 and 306 contain buffered block sums 312 and 308 for all the block partitions sizes that are taken into consideration in the motion estimation process (e.g. 64×64 down to 4×4). The motion estimation process is performed for these various partition sizes, which arrangement is called a mode. The identification of the best coding mode is performed in the usual manner. The current description focuses on the identification of the best motion vector for a specific block partitions size.

The motion estimation unit 242 further includes motion estimation function 314 for determining motion vectors 206 in accordance with the present invention. The motion estimation function 314 is described in detail in Section 3 herein below with reference to the flowchart 500 shown in FIG. 5A and sub-flowcharts thereof of FIGS. 5B-5H. Inputs to the motion estimation function 314 include the image to encode 204, the anchor (or selected) frame 232; the block coordinates 322; a list of co-ordinates of candidate vectors 320 representing a default search ordering; an array or lookup table representing the sum buffer 318 of the image to encode 204, and an array or lookup table representing the sum buffer 319 of the anchor frame 232.

2. RATE-CONSTRAINED SUCCESSIVE ELIMINATION ALGORITHMS

When performing motion estimation using block matching (BM), the cost function to minimize is defined as follows:

$$J=\Sigma|B-C(x_i,y_i)|+\lambda R(x_i,y_i)$$

where B is a matrix of the pixel values inside the current block to encode and $C(x_i, y_i)$ is a matrix of the pixel values of the $i^{th}$ candidate block located at position $(x_i, y_i)$ in the search area. The candidate motion vector is $(x_i, y_i)$. $\lambda$ is the Lagrange multiplier (for the HEVC standard, the recommended function to compute $\lambda$ is described in McCann et al. (2013)). The $R(x_i, y_i)$ function, often referred to as the rate, returns the number of bits required to encode the motion vector of the block matching candidate at position $(x_i, y_i)$. The motion vector associated with candidate block giving the optimal (smallest) value of J is referred as the best motion vector. The candidate associated with best motion vector is referred as the best block matching candidate (or best candidate). Typically, the block matching process computes sequentially the value of J for each candidate and updates the current best candidate to represent the candidate that provided the smallest J value among the candidates considered so far, i.e. when evaluating the value of J for the i-th candidate, the current best candidate is the one having the smallest J among the first i candidates (those for which J is known).

The Successive Elimination Algorithms (SEA) use the reverse triangle inequality to filter out block matching candidates whose cost function cannot be lower than the current cost of the best block matching candidate. This leads to computational savings of 85% when compared to ESA as reported by Li and Salari (1995).

The inequality proposed in Li and Salari (1995) is written as:

$$|\Sigma B-\Sigma C(x_i,y_i)|\le \Sigma|B-C(x_i,y_i)|, \quad (1)$$

We will refer to the left hand side of this equation as the absolute difference of sums (ADS). The right hand side contains the sum of the absolute differences (SAD) between the pixel values of the current block and those of the $i^{th}$ candidate block. Although the exemplary embodiment presented herein uses the SAD as an error metric, similar inequalities apply to different error metrics. For example: the sum of squared errors (SSE) can be used to filter out block matching candidates. By filtering candidates, we mean eliminate candidates without having to compute their actual SAD value (because it has no chance to be the optimal one from the relationship between ADS and SAD).

While the complexity of computing $\Sigma B$ and $\Sigma C(x_i, y_i)$ might appear to be equivalent to that of computing $\Sigma\delta|B-C(x_i, y_i)|$, using the fast calculation of block sums proposed in Li and Salari (1995), B and $C(x_i, y_i)$ are precomputed and only require table lookups during motion estimation. As explained in Li and Salari (1995), the overhead for pre-calculating these sums is negligible when compared to the savings gained.

Coban and Mersereau added the rate constraint to the successive elimination algorithms. In a rate-constrained video encoder, this constraint must be added to the SEA in order to produce correct results. Failure to do so could impair the motion estimation unit 242. They also found that the constraint produced a more effective filtering. The rate-constrained inequality is defined as:

$$|\Sigma B-\Sigma C(x_i,y_i)|+\lambda R(x_i,y_i)\le \Sigma|B-C(x_{i-1}^*,y_{i-1}^*)|+\lambda R(x_{i-1}^*,y_{i-1}^*), \quad (2)$$

The term $(x_i^*, y_i^*)$ is the motion vector of the current best candidate, considering the candidates from 0 to i in the search ordering, and is such that:

$$\forall n \in \{0, \ldots, i\}(\Sigma|B-C(x_i^*,y_i^*)|+\lambda R(x_i^*,y_i^*)\le \Sigma|B-C(x_n,y_n)|\lambda R(x_n,y_n)). \quad (3)$$

3. ADAPTIVE SEARCH ORDERING

Implementing the successive elimination algorithm combined with a spiral search ordering in the H.265/HEVC HM reference software can considerably reduce—but not eliminate—unnecessary cost function evaluations. For example, a spiral search ordering applied to a bad predicted motion vector would cause multiple unnecessary cost function evaluations. Even with a good motion vector prediction, the spiral ordering does not follow the monotonically increasing rate rule defined in Trudeau, Coulombe, and Desrosiers (2014). This will lead to unnecessary cost function evaluations as the SEA threshold in equation 2 will vary according to the difference in rate between the best block matching candidate and the current candidate. To avoid this, the motion vector cost of the search ordering must increase monotonically, otherwise the SEA filtering criterion is weakened.

While exponential Golomb codes are no longer used to encode motion vectors, the method proposed by Trudeau, Coulombe, and Desrosiers (2014) for H.264 can be extended to HEVC. In HEVC, exponential Golomb are recommended as a fast estimate of the motion vector cost for the rate-constrained motion estimation algorithm, as implemented in the HEVC reference software McCann et al. (2013).

The class of search orderings, proposed in Trudeau, Coulombe, and Desrosiers (2014), also known as rate-constrained search orderings, are based on the monotonically increasing rate rule $$R(x_i, y_i) \leq R(x_{i-1}, y_{i-1}). \quad (4)$$

This rule states that block matching candidates must be evaluated by increasing order of motion vector bit length, hence the name rate-constrained search ordering. We can see from FIG. 4 that multiple search orderings can be derived from this rule, as the ordering of candidates with the same motion vector bit length can be intermixed.

Figure 4:
FIG. 4 is a representative diagram of motion vector bit lengths for block matching candidates of a subset of a search area.

Referring to FIG. 4, motion vector bit lengths for the block matching candidates of a subset of the search area. The bolded center square is the predicted motion vector. Multiple rate-constrained search orderings are possible, as block matching candidates with the same motion vector bit length can be combined in any order.

With multiple search orderings comes the question of which ordering is optimal, which is not trivial to answer. Because the efficiency of the search ordering is greatly influenced by the content of the video sequence.

A search is SEA-optimal if the cost function is evaluated only for the block matching candidates such that:

$$|\Sigma B - \Sigma C(x_i, y_i)| + \lambda R(x_i, y_i) \leq \Sigma |B - C(\bar{x}, \bar{y})| + \lambda R(\bar{x}, \bar{y}), \quad (5)$$

where $$(\hat{x}, \hat{y})$$

is the best candidate over the entire search area. Thus, the search is SEA-optimal if the number of cost function evaluations is equal to the number of block matching candidates, where the rate-constrained ADS (RCADS) is less than the best rate-constrained SAD (RCSAD) found inside the search area (only those candidates have a chance to be optimal). Indeed, because of equation 1 it is unnecessary to evaluate candidates that do not meet equation 5. We do not know the best candidate needed to apply equation 5.

The Motion Estimation function 314 which is an adaptive method for an SEA-optimal search, will now be described with regard to the flowchart of FIGS. 5A-5H, and Listing 1 below. Listing 1 is written in Pseudo code as defined in *Introduction to Algorithms*, Third Edition By Thomas H. Cormen, Charles E. Leiserson, Ronald L. Rivest and Clifford Stein, ISBN: 0262033844 (2009).

The inputs to the Motion Estimation Function 314 are: B, the image to encode 204; C, the anchor (or selected) frame 232; (bx,by), the block coordinates 322; ord, a list of co-ordinates of candidate vectors 320 representing a default search ordering; sB, is an array or lookup table representing the sum buffer 318 of B 204, and sC, an array or lookup table representing the sum buffer 319 of the C anchor frame 232.

Figure 5A:
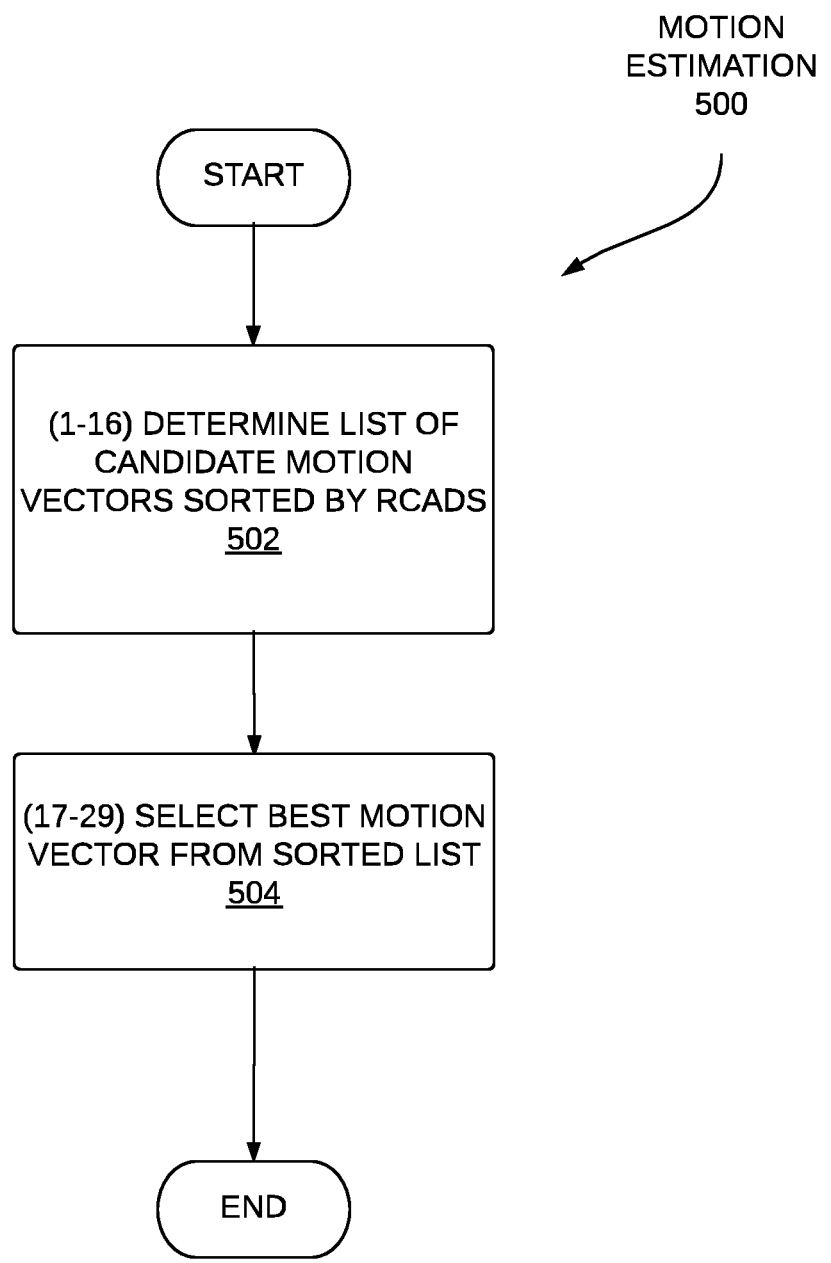
FIG. 5A is a flowchart of a motion estimation function in accordance with embodiments of the present invention.

The top level flowchart 500 in FIG. 5A provides an overview of the Motion Estimation Function 314.

First, step 502, lines 1-16, a list of candidate motion vectors having an order determined by a respective approximate block similarity metric value of the candidate motion vectors in the list of candidate motion vectors. The approximate block similarity metric value may be, for example, a Rate Constrained Absolute Difference of Sums (RCADS) metric value.

Then, in step 504, lines 17-29, a best motion vector having a smallest block similarity metric value of the determined respective block similarity metric values is selected, from the list of candidate motion vectors. The block similarity metric value may be, for example, a Rate Constrained Sum of Absolute Differences (RCSAD) value.

Figure 5B:
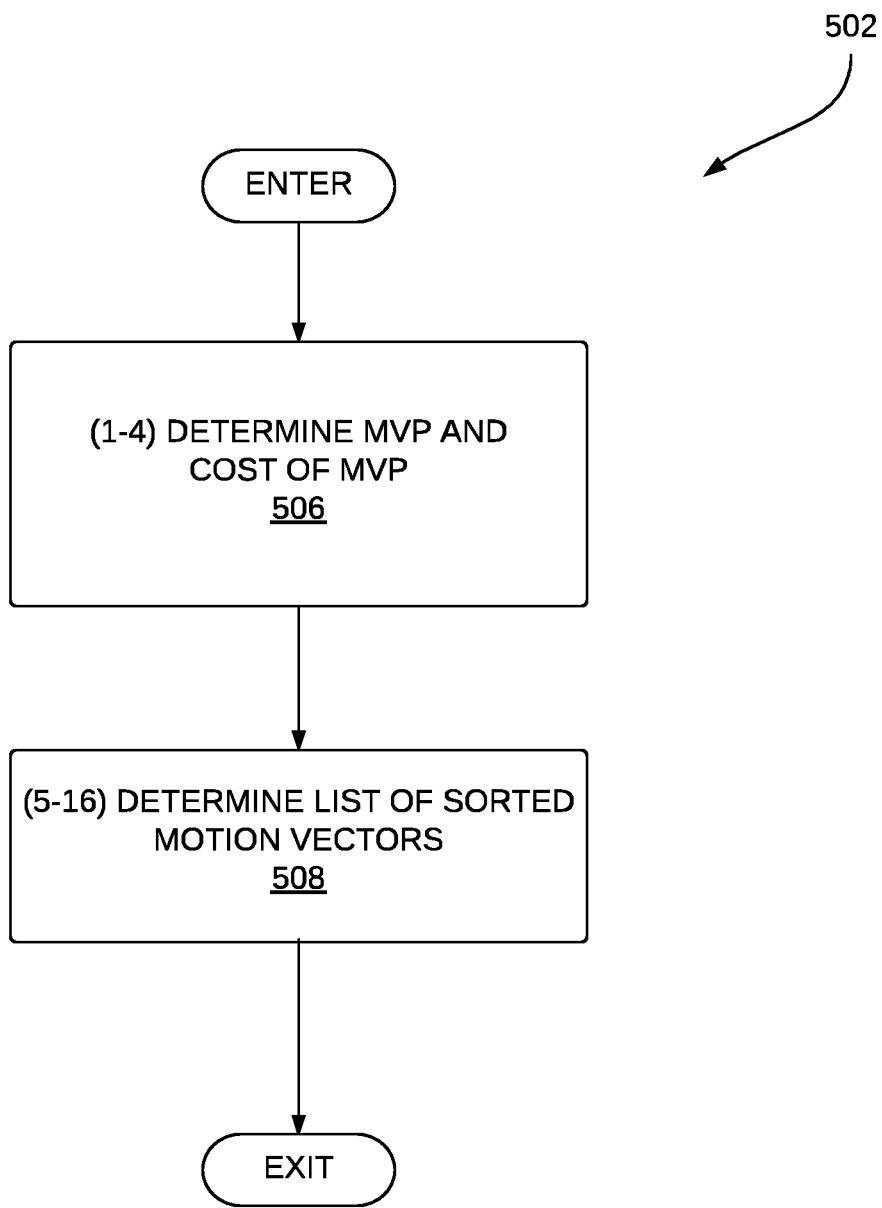
FIG. 5B is a sub-flowchart of FIG. 5A of a method for determining a list of candidate motion vectors.

Referring to FIG. 5B, step 502, lines 1-16, includes a step 506, lines 1-4, for determining a predicted motion vector (MVP) and a cost of the MVP. Step 502, lines 1-16, further includes a step 508, lines 5-16, for determining a list of sorted candidate motion vectors.

Figure 5C:
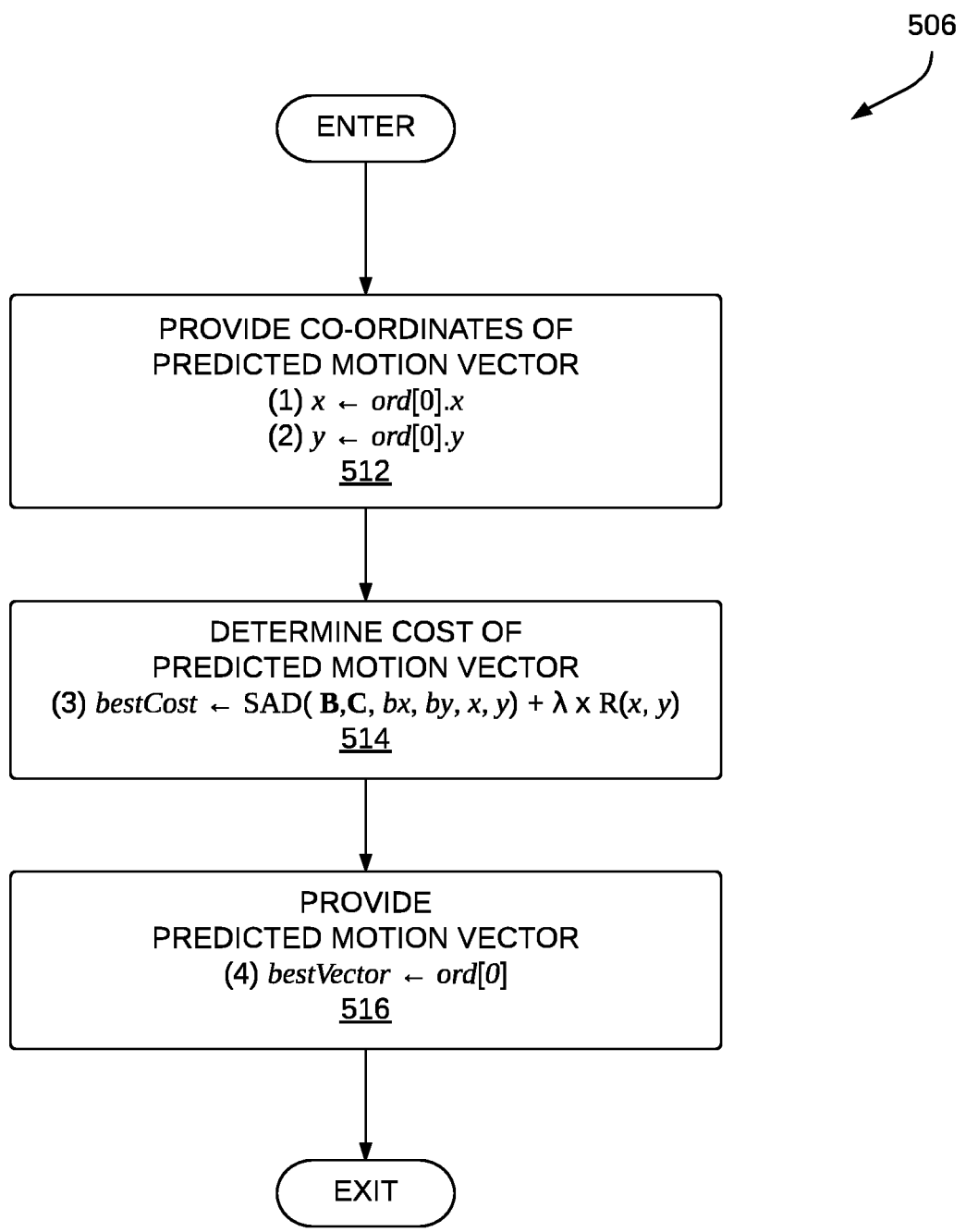
FIG. 5C is a sub-flowchart of FIG. 5B of a method for determining a preferred motion vector (MVP) and determining a cost of the MVP.

Referring to FIG. 5C, step 506, lines 1-4, includes a step 512, lines 1-2, of providing co-ordinates of the first candidate from a predetermined list of candidate motion vectors. In practice, these co-ordinates correspond to the motion vector predictor (MVP). Indeed, the MVP is a motion vector that is typically within the predetermined list of candidate motion vectors because it has a shortest motion vector bit length of the candidate motion vectors in the predetermined list of candidate motion vectors. Alternatively, the co-ordinates may be a first motion vector from the predetermined list of candidate motion vectors wherein an order of the predetermined list of candidate motion vectors is a spiral scan search order. The underlying assumption is that the likelihood of finding the smallest candidate decreases as the magnitude of the motion vector increases. But again, the MVP would be the first to evaluate in the list because it is already computed. To simplify the description, we assume the MVP has the first position in the list.

Step 506, lines 1-4, further includes a step 514, line 3 for determining a block similarity metric value of the MVP. Preferably, the block similarity metric value of the MVP is a RCSAD value of the predicted motion vector.

Step 506, lines 1-4, further includes a step 516, line 4, wherein the co-ordinates of the predicted motion vector are provided from the predetermined list of candidate motion vectors.

Figure 5D:
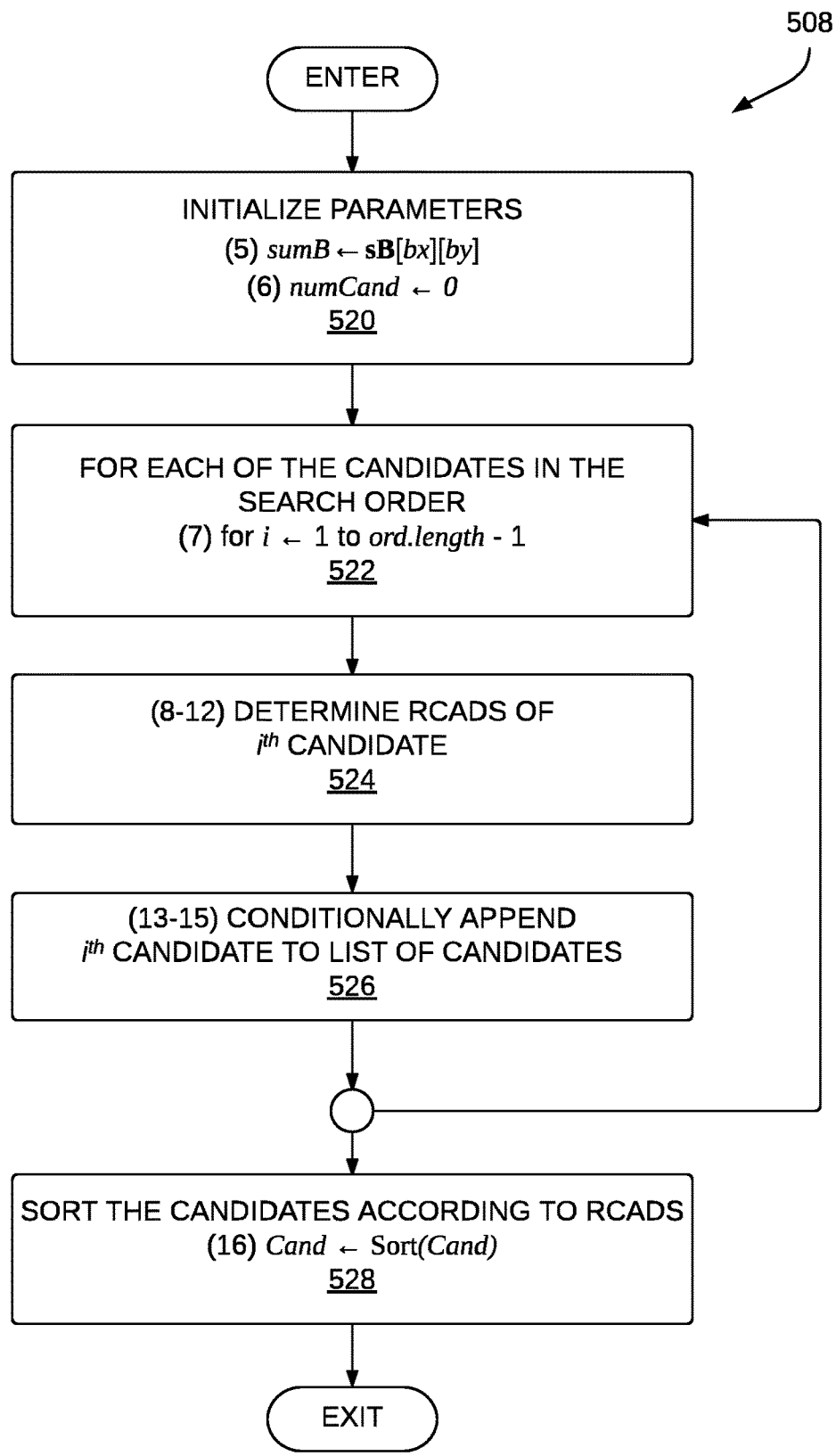
FIG. 5D is a sub-flowchart of FIG. 5B of a method for determining a sorted list of motion vectors.

Referring to FIG. 5D, step 508, lines 5-16, includes a step 520, lines 5-6, for initializing parameters. The block sum buffer 318 of the image to encode is provided and a counter for determining a length of the list of sorted candidate motion vectors is initialized.

Step 508, lines 5-16, further includes a loop 522,524,526 for determining a list of candidate motion vectors and respective approximate block similarity metric values. Preferably, the respective approximate block similarity metric values are RCADS values.

Step 508, lines 5-16, further includes a step 528, line 16 (of listing 1), for sorting in ascending order the list of candidate motion vectors according to their respective rate-constrained approximate block similarity metric values (e.g. RCADS). When comparing the rate-constrained approximate block similarity metric value of each candidate to the current best rate-constrained metric value, it is important that this is done from the candidates with the lowest rate-constrained approximate block similarity metric value to the highest.

Figure 5E:
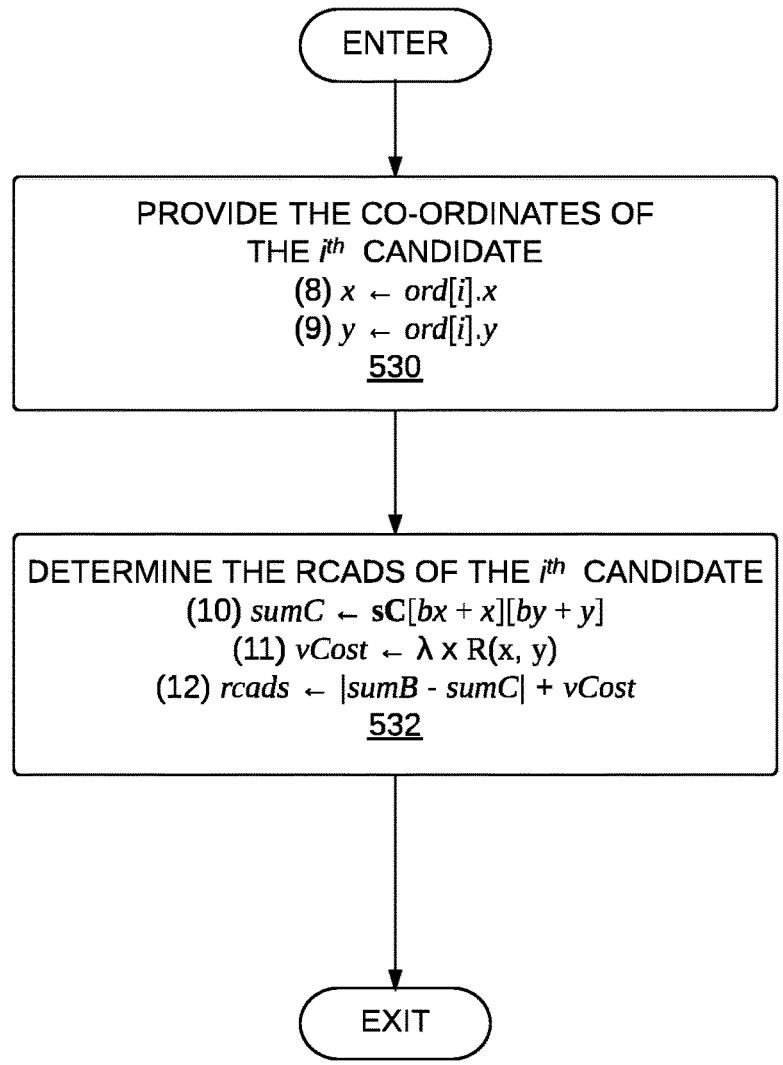
FIG. 5E is a sub-flowchart of FIG. 5D of a method for determining RCADS (Rate-Constrained Absolute Difference of Sums) of an $i^{th}$ candidate motion vector.

Referring to FIG. 5E, step 524, lines 8-12, includes a step 530 for providing co-ordinates of the $i^{th}$ candidate motion vector in the list of candidate motion vectors.

Step 524, lines 8-12, further includes step 532, lines 10-12, for determining the approximate block similarity metric value of the $i^{th}$ candidate motion vector in the list of candidate motion vectors.

Figure 5F:
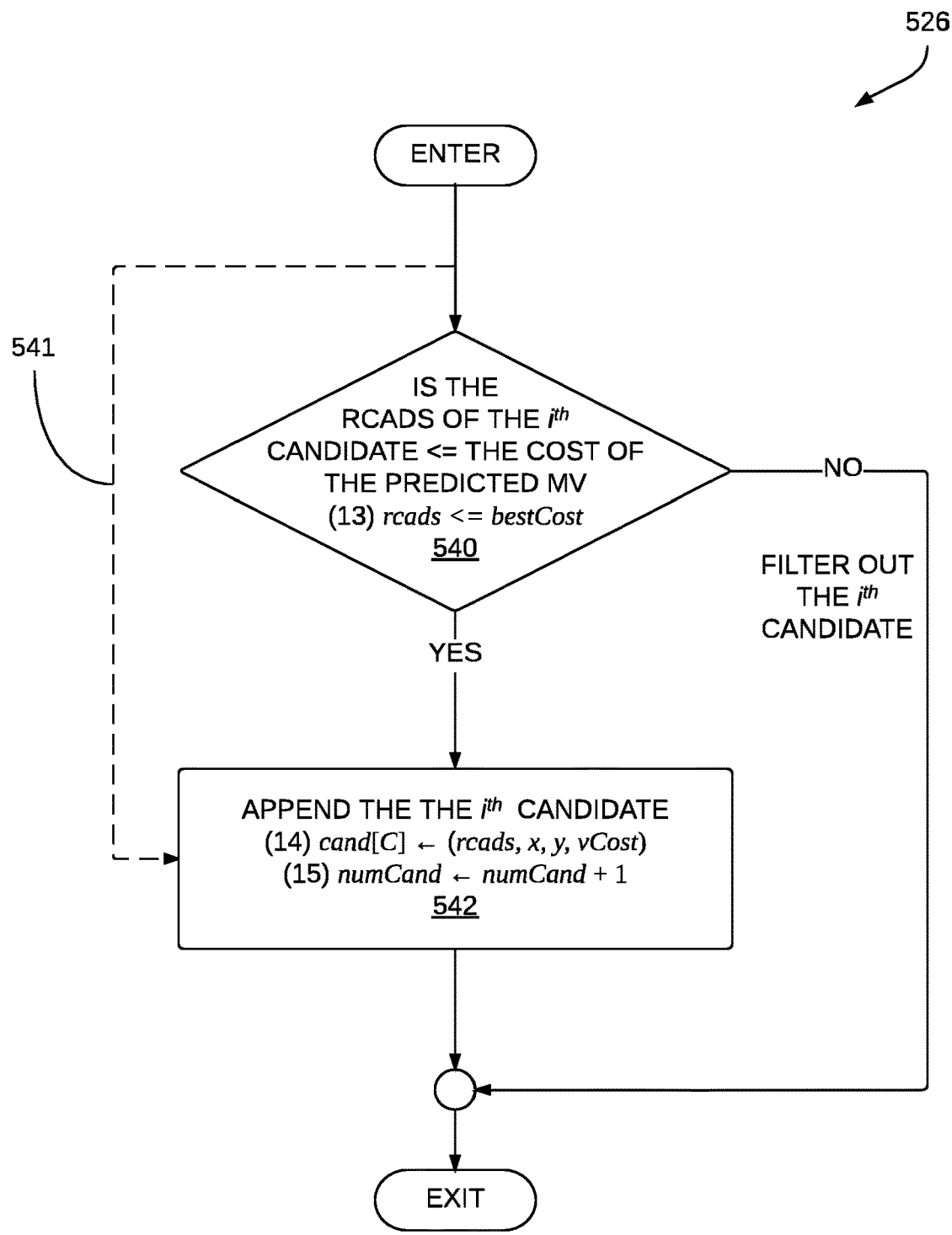
FIG. 5F is a sub-flowchart of FIG. 5D of a method for conditionally appending the candidate motion vector to the list of candidate motion vectors.

Referring to FIG. 5F, step 526, lines 13-15, includes steps 540,541,542, for optionally appending the $i^{th}$ candidate motion vector to a list of candidate motion vectors, thereby providing a subset of the list of candidate motion vectors. Step 540 reduces processing complexity by reducing a number of the block matching candidates that will be sorted (in step 528, line 16).

We evaluate the cost function of a candidate, by applying its cost in equation 2, we can filter out candidates with higher RCADS. The closer the cost function is to the best cost, the better the filter will be. For convenience, we will use the cost function of the predicted motion vector (step 514, line 3) as an upper bound in equation 5 to replace the best cost (which is yet unknown). In a worst case, the predictor will not be effective, and all candidates will need to be sorted. However, this will not affect the number of cost function evaluations (just the number of candidates to sort, which has a small impact on performance).

Figure 5G:
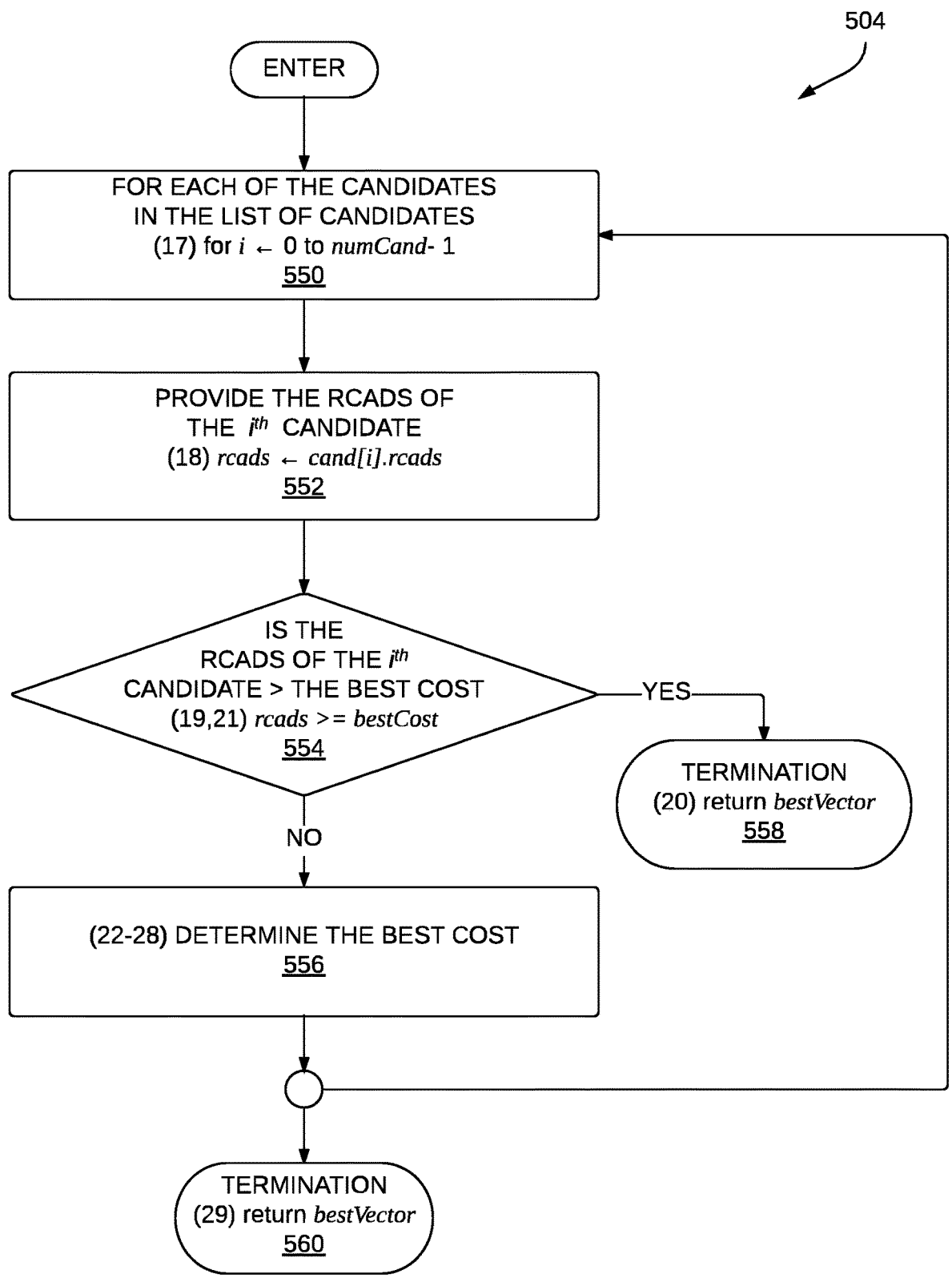
FIG. 5G is a sub-flowchart of FIG. 5A of a method for selecting a best motion vector from the sorted list of motion vectors.

Referring to FIG. 5G, step 504, lines 17-29, includes steps 550,552,554,556,558. Starting with the lowest RCADS candidate, we successively evaluate the cost value and update the best (lowest) cost value. The later value serves as the early termination threshold. This evaluation and update process continues until the RCADS of a candidate is equal to or greater than the early termination threshold (lines 19-21), at which point, step 558, the best motion vector is found.

As an additional note, the early termination threshold is set during the initialization phase of the proposed algorithm (line 3 of listing 1); however, the early termination threshold changes during the cost evaluation process every time line 27 of listing 1 is evaluated (when a better current best rate-constrained metric value is found). Evaluating the cost function of the remaining candidate motion vectors becomes irrelevant (because of equation 2). This procedure is SEA-optimal because no candidate for which RCADS is higher than the best cost is evaluated (this is apparent from the RCADS-sorted scan order). It is also apparent that the proposed procedure ensures that the optimal value is found.

Figure 5H:
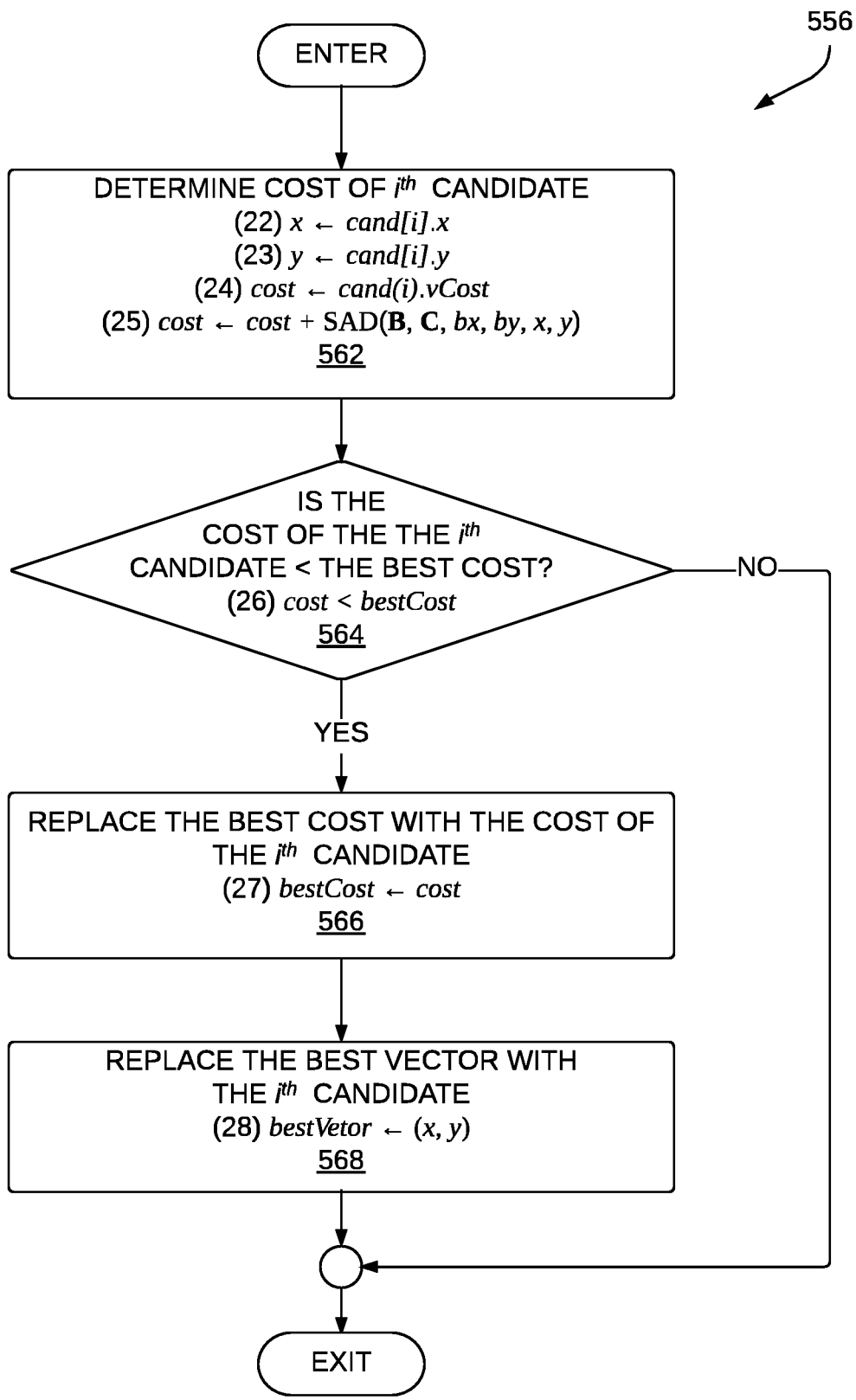
FIG. 5H is a sub-flowchart of FIG. 5G of a method for determining a best cost of the candidate motion vectors in the list of candidate motion vectors.
Figure 6:
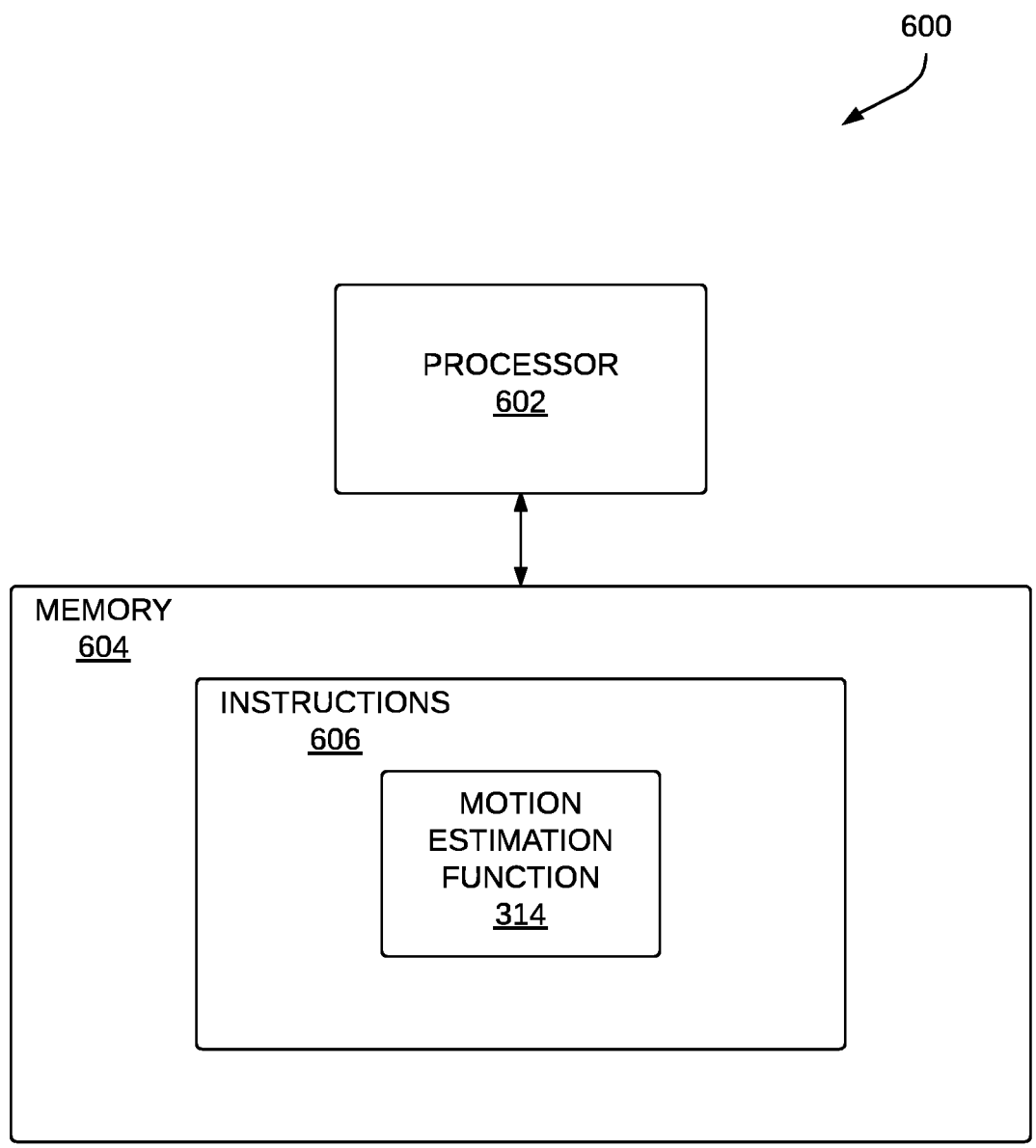

Referring to FIG. 5H, step 556, lines 22-28, includes a step 562, lines 22-25, for determining a cost of the $i^{th}$ candidate motion vector.

Step 556, lines 26-28 further includes steps 564, 566, 568 for conditionally replacing the best vector and best cost if the cost of the $i^{th}$ vector is less than the best cost found so far.

It is important to note that the proposed filtering method is based on exploiting a mathematical inequality such as equation 1. Furthermore, a mathematical inequality such as equation 1, permits us to perform an early termination of the cost evaluation process (step 504, lines 17-29 in listing 1) when the remaining candidates, after filtering, are sorted in ascending order according to their respective rate-constrained approximate block similarity metric values. Note that the mathematical inequality used for filtering doesn't have to be the same as the one for performing early termination. Also, although the process of filtering is desirable to save computations, the early termination can be performed on sorted unfiltered candidates as well.

By sorting the candidates by RCADS, it can be shown that the proposed solution will perform the same number of SAD operations as if the global minimum was known and used instead of the bestCost variable at line 26 of listing 1. Therefore, the proposed method leads to the least amount of SAD operations possible.

In the presented embodiment, we have exploited the reverse triangle inequality for the 1-norm where an approximate block similarity metric is always smaller than or equal (the ADS in our example) to a block similarity metric of interest (the SAD in our example). Indeed, it is common knowledge in vector algebra that the triangle inequality generalizes to higher dimensions (higher powers). And any inequality is also preserved once the rate constraint is added. In some cases, the rate constraint can even improve the filtering operation.

In the context of our invention, the generalized form of the triangle inequality is defined as:

$$\|B\|_p - \|C(x_i, y_i)\|_p \le \|B - C(x_i, y_i)\|_p,$$

where p is the power used for the block similarity metric, and $\|B\|$ is the norm of B, such that:

$$\|B\|_p = \left( \sum_{m=0}^{M-1} \sum_{n=0}^{N-1} |B_{m,n}|^p \right)^{\frac{1}{p}},$$

where B is a block of size M×N.

Block similarity metrics like the SAD and the sum of squared errors (SSE) are norms with different values of p (p=1 for SAD and p=2 for SSE).

Concretely, equation 1 can be obtained using the generalized form of the triangle inequality with, p=1. An important note is that by using the triangle inequality the proposed invention inherits the ability to generalize to all powers.

Our work is mainly focused on the SAD, because its widespread use in video encoders. However, our invention can be used bigger values of p. For example, given a video encoder programmed to use the SSE as a similarity metric, the proposed invention is compatible as long as the generalized form is used with p=2.

The proposed process of filtering and early termination also applies to other contexts where it is ensured that an approximate block similarity metric is always smaller or equal to a block similarity metric of interest (i.e. when the approximate block similarity metric is bounded by the block similarity metric of interest).

The method becomes beneficial when the approximate block similarity metric can be computed with significantly lower computational complexity (either because it is simpler to compute or because we can cache or reuse the results) than the metric of interest. In our case, the approximate block similarity metric was the ADS which had SAD as higher bound (i.e. ADS≤SAD).

Listing 1: Motion Estimation Function

```
MOTIONESTIMATION(B, C, bx, by, ord, sB, sC)
1   x = ord[0].x
2   y = ord[0].y
3   bestCost = SAD(B, C, bx, by, x, y) + λ × R(x,y)
4   bestVector = ord[0]
5   sumB = sB[bx][by]
```

Listing 1: Motion Estimation Function

```
 6   numCand = 0
 7   for i = 1 to ord.length − 1
 8       x = ord[i].x
 9       y = ord[i].y
10       sumC = sC[bx + x][by + y]
11       vCost = λ × R(x,y)
12       rcads = |sumB − sumC| + vCost
13       if rcads ≤ bestCost
14           cand[numCand] = (rcads,x,y, vCost)
15           numCand = numCand + 1
16   cand = SORT(cand) //      Sorted by rcads.
17   for i = 0 to numCand − 1
18       rcads = cand[i].rcads
19       if rcads ≥ bestCost
20           return bestVector
21       else
22           x = cand[i].x
23           y = cand[i].y
24           cost = cand[i].vCost
25           cost = cost + SAD(B, C, bx, by, x, y)
26           if cost < bestCost
27               bestCost = cost
28               bestVector = (x,y)
29   return bestVector
```

4. EXPERIMENTAL RESULTS

To test our hypotheses, we implemented the rate-constrained SEA with a spiral scan search ordering and the proposed approach in the H.265/HEVC HM 13.1 reference software McCann et al. (2013).

By comparing the cost function evaluation of both approaches, we could determine the percentage of unnecessary cost function evaluations performed by the RCSEA with a spiral search ordering.

Table 1 presents detailed results of our experiment for the first 100 frames of standard Class C (832×480) video sequences ("Basketball Drill", "Party Scene", "BQ Mall" and "Race Horses").

The results are presented by block sizes and by QP values. We used the main profile with the following alterations: 5 reference frames, disabled asymmetric motion partitions, full pixel precision motion estimation and full search motion estimation.

TABLE 1

Percentage of unnecessary cost function evaluations made by a rate-constrained SEA with a spiral scan search ordering in the H.265 HM reference software compared to embodiments of the present invention.

| Block Size | QP | Basket | Party | Mall | Horses |
|---|---|---|---|---|---|
| 4 × 8, 8 × 4 | 22 | 8.29 | 5.58 | 3.35 | 7.59 |
| 8 × 8 | 22 | 4.74 | 3.56 | 2.33 | 6.34 |
| 8 × 16, 16 × 8 | 22 | 3.59 | 2.60 | 1.66 | 5.97 |
| 16 × 16 | 22 | 3.22 | 2.15 | 1.23 | 5.80 |
| 16 × 32, 32 × 16 | 22 | 2.94 | 1.94 | 0.96 | 5.44 |
| 32 × 32 | 22 | 2.61 | 1.60 | 0.77 | 4.93 |
| 32 × 64, 64 × 32 | 22 | 2.14 | 1.18 | 0.60 | 3.87 |
| 64 × 64 | 22 | 1.89 | 0.60 | 0.31 | 2.89 |
| 4 × 8, 8 × 4 | 27 | 10.99 | 6.73 | 3.25 | 8.46 |
| 8 × 8 | 27 | 5.94 | 4.33 | 2.14 | 6.49 |
| 8 × 16, 16 × 8 | 27 | 3.56 | 3.01 | 1.53 | 5.79 |
| 16 × 16 | 27 | 2.87 | 2.21 | 1.16 | 5.50 |
| 16 × 32, 32 × 16 | 27 | 2.57 | 1.91 | 0.93 | 5.18 |
| 32 × 32 | 27 | 2.23 | 1.58 | 0.75 | 4.73 |
| 32 × 64, 64 × 32 | 27 | 1.81 | 1.16 | 0.56 | 3.79 |
| 64 × 64 | 27 | 1.62 | 0.61 | 0.31 | 2.88 |
| 4 × 8, 8 × 4 | 32 | 13.12 | 7.95 | 3.30 | 10.10 |
| 8 × 8 | 32 | 7.78 | 4.99 | 1.97 | 6.99 |
| 8 × 16, 16 × 8 | 32 | 4.39 | 3.30 | 1.38 | 5.86 |
| 16 × 16 | 32 | 2.89 | 2.29 | 1.06 | 5.42 |
| 16 × 32, 32 × 16 | 32 | 2.51 | 1.83 | 0.88 | 5.10 |
| 32 × 32 | 32 | 2.14 | 1.46 | 0.72 | 4.62 |
| 32 × 64, 64 × 32 | 32 | 1.76 | 1.07 | 0.52 | 3.80 |
| 64 × 64 | 32 | 1.46 | 0.58 | 0.27 | 2.79 |
| 4 × 8, 8 × 4 | 37 | 15.35 | 9.19 | 3.31 | 12.45 |
| 8 × 8 | 37 | 9.06 | 5.51 | 1.84 | 7.33 |

As stated in Trudeau, Coulombe, and Desrosiers (2014), changing the search ordering has negligible to no impact on rate-distortion as all candidates are considered, only in a different order.

From the results in Table 1, we can see that an embodiment of the present invention is more effective for smaller block sizes. This is due to the fact that smaller blocks comprise fewer pixels, which leads to more precise ADS values. These values filter out more unnecessary cost function evaluations. Since most SEA-based algorithms partition bigger blocks using multiple small partitions to improve filtering efficiency Gao, Duanmu, and Zou (2000); Zhu, Qi, and Ser (2005); Yang, Cui, and Tang (2004); Toivonen, T., and J. Heikkila. 2004. "Fast Full Search Block Motion Estimation for H.264/AVC with Multilevel Successive Elimination Algorithm." In 2004 *IEEE International Conference on Image Processing* (ICIP 2004), 1485-88. Singapore. doi:10.1109/ICIP.2004.1421345), they would benefit significantly from the proposed method.

As the QP increases, the effectiveness of the proposed method also increases. This is analogous to the findings of Coban and Mersereau (1998), and is caused by an increase in the value of the Lagrange multiplier. This in turn increases the ratio between the weighted number of bits required to encode the motion vector and the prediction error. When this occurs, the rate constraint becomes more significant and allows more block matching candidates to be filtered.

Table 1 shown above shows that the proposed search ordering is, on average, more efficient with sequences that contain important and unpredictable movement ("Basketball Drill" and "Race Horses"), than with those with more predictable sequences. Unpredictable sequences lead to less precise motion vector predictions, and for them, hard-coded search orderings, such as spiral scan, will search around a bad starting point leading to unnecessary cost function evaluations. In the same context, by sorting block matching candidates, the proposed adaptive approach exploits the relative precision of the RCADS, allowing candidates around the true motion vector to be considered earlier in the search process.

5. CONCLUSION

Embodiments of the present invention provide a solution for the problem of unnecessary cost function evaluations, found when combining the successive elimination method with a predetermined list of candidate motion vectors scan search ordering. Experiments show that the implementation of such a combination inside the HEVC reference software leads to unnecessary cost function evaluations. On the tested video sequences, an average of 3.46% unnecessary cost function evaluations was measured. Considering only small block sizes (e.g., 4×8 and 8×4), this average rises to 8.06%. To solve this problem, embodiments of the present invention provide an adaptive scan ordering of block matching candidates within the search area. When used with an early termination threshold, embodiments of the present invention will only evaluate necessary cost functions, without impacting rate-distortion.

Embodiments of the present invention provide methods and systems that can dynamically adapt the search ordering of the motion estimation unit 242, and an early termination threshold that guarantees to only perform necessary cost function evaluations. Our experiments show that, without our method, an implementation of the rate-constrained successive elimination method using a spiral scan search ordering in the H.265/HEVC HM reference software would lead to an average of 3.5% unnecessary cost function evaluations. In some instances, the proposed method can reduce the percentage of cost function evaluations up to 15%.

Although the embodiments of the invention have been described in detail, it will be apparent to one skilled in the art that variations and modifications to the embodiment may be made within the scope of the following claims.

What is claimed is:

1. A method for determining a best motion vector in a motion estimation process of a video encoder, the method comprising:
   using a hardware processor for:
   determining a sorted list of candidate motion vectors having an order determined by a respective approximate block similarity metric value of each of the candidate motion vectors;
   determining the best motion vector, comprising:
   sequentially determining respective block similarity metric values of a corresponding candidate motion vector in the sorted list as one of the Rate Constrained Absolute Difference of Sums (RCADS) values and Rate Constrained Sum of Absolute Differences (RCSAD) values, until the respective approximate block similarity metric value is greater than or equal to a termination threshold corresponding to a smallest block similarity metric value among determined respective block similarity metric values;
   from the sorted list, selecting the best motion vector having the smallest block similarity metric value among the determined respective block similarity metric values; and
   using the best motion vector in the motion estimation process of the video encoder.

2. The method of claim 1, wherein the respective approximate block similarity metric value and the respective block similarity metric values are metrics for which the former is smaller or equal to the latter.

3. The method of claim 1, performing the motion estimation for one of the High Efficiency Video Coding (HEVC) and H.265 video coding standards.

4. A method for determining a best motion vector in a motion estimation process of a video encoder, the method comprising:
   using a hardware processor for:
   determining a sorted list of candidate motion vectors, comprising:
   determining a respective approximate block similarity metric value for each candidate motion vector in a predetermined list of candidate motion vectors;
   determining a subset of the predetermined list of candidate motion vectors wherein the respective approximate block similarity metric value for each candidate motion vector in the subset is less than or equal to a block similarity metric value of a predicted motion vector; and
   determining the sorted list of candidate motion vectors, comprising sorting the predetermined list of candidate motion vectors according to the respective approximate block similarity metric value;
   determining the best motion vector, comprising:
   sequentially determining respective block similarity metric values of the candidate motion vectors in the sorted list until the respective approximate block similarity metric value is greater than or equal to a termination threshold corresponding to a smallest block similarity metric value among the determined respective block similarity metric values;
   from the sorted list, selecting the best motion vector having the smallest block similarity metric value of the determined respective block similarity metric values; and
   using the best motion vector in the motion estimation process of the video encoder.

5. The method of claim 4, comprising determining the respective approximate block similarity metric value of each of the candidate motion vectors in the sorted list of candidate motion vectors as respective Absolute Difference of Sums (ADS) values of the candidate motion vectors.

6. The method of claim 4, wherein the determining the respective block similarity metric values of the candidate motion vectors in the sorted list of candidate motion vectors comprises determining the respective block similarity metric values as Sum of Absolute Differences (SAD) values of the candidate motion vectors.

7. The method of claim 4, wherein the respective approximate block similarity metric value and the respective block similarity metric value are metrics for which the former is smaller or equal to the latter.

8. The method of claim 4, wherein the determining the sorted list of candidate motion vectors comprises:
   determining the respective approximate block similarity metric value for each candidate motion vector in a predetermined list of candidate motion vectors; and
   determining the sorted list of candidate motion vectors by sorting the predetermined list of candidate motion vectors according to the respective approximate block similarity metric value for each candidate motion vector.

9. The method of claim 4, wherein the determining the subset of the predetermined list of candidate motion vectors comprises:
   determining the predicted motion vector by selecting, from the predetermined list of candidate motion vectors, a motion vector having a shortest motion vector bit length of the candidate motion vectors in the predetermined list of candidate motion vectors.

10. The method of claim 4, wherein the determining the best motion vector comprises:
   sequentially determining, from the sorted list of candidate motion vectors, the respective block similarity metric values of the candidate motion vectors in the sorted list of candidate motion vectors; and
   comparing the respective approximate block similarity metric value of the candidate motion vectors in the sorted list of candidate motion vectors with the respective block similarity metric values of the candidate motion vectors in the sorted list of candidate motion vectors.

11. A system for determining a best motion vector in a motion estimation process of a video encoder, the system comprising:
a non-transitory computer readable storage medium having instructions stored thereon that, when executed, cause a processor to:
determine a sorted list of candidate motion vectors having an order determined by a respective approximate block similarity metric value of each of the candidate motion vectors;
sequentially determine respective block similarity metric values of a corresponding candidate motion vector in the sorted list as one of the Rate Constrained Absolute Difference of Sums (RCADS) values and Rate Constrained Sum of Absolute Differences (RCSAD) values, until the respective approximate block similarity metric value is greater than or equal to a termination threshold corresponding to a smallest block similarity metric value among determined respective block similarity metric values;
from the sorted list, select the best motion vector as the best motion vector having the smallest block similarity metric value among the determined respective block similarity metric values; and
use the best motion vector in the motion estimation process of the video encoder.

12. The system of claim 11, wherein the instructions that cause the processor to determine the sorted list of candidate motion vectors cause the processor to:
determine the respective approximate block similarity metric value for each candidate motion vector in a predetermined list of candidate motion vectors; and
determine the sorted list of candidate motion vectors by sorting the predetermined list of candidate motion vectors according to the respective approximate block similarity metric value for each candidate motion vector.

13. The system of claim 11, wherein the respective approximate block similarity metric value and the respective block similarity metric values are metrics for which the former is smaller or equal to the latter.

14. The system of claim 11, wherein the instructions cause the processor to perform the motion estimation for one of the High Efficiency Video Coding (HEVC) and H.265 video coding standards.

15. A system for determining a best motion vector in a motion estimation process of a video encoder, the system comprising:
a non-transitory computer readable storage medium having instructions stored thereon that, when executed, cause a processor to:
determine a sorted list of candidate motion vectors, comprising:
determine a respective approximate block similarity metric value for each candidate motion vector in a predetermined list of candidate motion vectors;
determine a subset of the predetermined list of candidate motion vectors wherein the respective approximate block similarity metric value for each candidate motion vector in the subset is less than or equal to a block similarity metric value of a predicted motion vector; and
determine the sorted list of candidate motion vectors comprising sorting the predetermined list of candidate motion vectors according to the respective approximate block similarity metric value;
sequentially determine a respective block similarity metric value of a corresponding candidate motion vector in the sorted list, until the respective approximate block similarity metric value is greater than or equal to a termination threshold corresponding to a smallest block similarity metric value among determined respective block similarity metric values;
from the sorted list, select the best motion vector as the best motion vector having the smallest block similarity metric value among the determined respective block similarity metric values;
use the best motion vector in a motion estimation process of a video encoder.

16. The system of claim 15, wherein the instructions cause the processor to determine the respective approximate block similarity metric value of each of the candidate motion vectors in the sorted list of candidate motion vectors as respective Absolute Difference of Sums (ADS) values of the candidate motion vectors.

17. The system of claim 15, wherein the instructions that cause the processor to determine the respective block similarity metric values of the candidate motion vectors in the sorted list of candidate motion vectors cause the processor to determine the respective block similarity metric values as Sum of Absolute Differences (SAD) values of the candidate motion vectors.

18. The system of claim 15, wherein the respective approximate block similarity metric value and the respective block similarity metric values are metrics for which the former is smaller or equal to the latter.

19. The system of claim 15, wherein the instructions cause the processor to determine the subset of the predetermined list of candidate motion vectors cause the processor to:
determine the predicted motion vector by selecting, from the predetermined list of candidate motion vectors, a motion vector having a shortest motion vector bit length of the candidate motion vectors in the predetermined list of candidate motion vectors.

20. The system of claim 15, wherein the instructions which cause the processor to determine the best motion vector comprise:
sequentially determine, from the sorted list of candidate motion vectors, the respective block similarity metric values of the candidate motion vectors in the sorted list of candidate motion vectors; and
compare the respective approximate block similarity metric value of the candidate motion vectors in the sorted list of candidate motion vectors with the respective block similarity metric values of the candidate motion vectors in the sorted list of candidate motion vectors.

* * * * *